(12) United States Patent
Isshiki

(10) Patent No.: US 8,451,484 B2
(45) Date of Patent: May 28, 2013

(54) INFORMATION PROCESSING APPARATUS, PRINTING APPARATUS, ELECTRONIC DEVICE, AND COMPUTER PROGRAM THEREFOR BASED ON EXISTENCE OF PRINTER CONFIGURATION FILE

(75) Inventor: Naohiro Isshiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1315 days.

(21) Appl. No.: 11/549,538

(22) Filed: Oct. 13, 2006

(65) Prior Publication Data

US 2007/0104525 A1    May 10, 2007

(30) Foreign Application Priority Data

Nov. 4, 2005 (JP) .................................. 2005-321377

(51) Int. Cl.
    *G06K 15/00* (2006.01)

(52) U.S. Cl.
    USPC ............... 358/1.16; 358/1.1; 400/62; 400/63; 710/8; 710/14; 710/74; 710/31; 710/52; 710/62; 710/72; 710/12

(58) Field of Classification Search
    CPC ..... G06K 15/00; G06K 15/02; H04N 1/32358; H04N 2201/0082; H04N 2201/0094
    USPC ............... 358/1.15, 1.16; 400/62, 61; 710/8, 710/12–14, 31, 52, 62, 72, 74
    See application file for complete search history.

(56) References Cited

U.S. PATENT DOCUMENTS

| 7,061,633 | B1 * | 6/2006 | Shima ........................... 358/1.15 |
| 2002/0062404 | A1 * | 5/2002 | Ecob et al. ..................... 709/321 |
| 2003/0053102 | A1 * | 3/2003 | Kelsey .......................... 358/1.13 |
| 2004/0225836 | A1 | 11/2004 | Lin |
| 2005/0036793 | A1 * | 2/2005 | Endo .............................. 399/10 |
| 2005/0182822 | A1 * | 8/2005 | Daniel et al. ................... 709/213 |
| 2005/0190399 | A1 | 9/2005 | Nakaoka et al. |
| 2005/0195435 | A1 * | 9/2005 | Kojima et al. ................. 358/1.16 |
| 2005/0264841 | A1 * | 12/2005 | Gassho et al. ................. 358/1.15 |
| 2007/0121131 | A1 * | 5/2007 | Hauser .......................... 358/1.9 |

FOREIGN PATENT DOCUMENTS

| JP | 09-272233 A | 10/1997 |
| JP | 2005-138531 A | 6/2005 |
| JP | 2005-219225 A | 8/2005 |

OTHER PUBLICATIONS

Ishiyama Katsunori, Image Processing Apparatus, Jun. 2, 2005, JP 2005-138531.*

* cited by examiner

*Primary Examiner* — Benny Q Tieu
*Assistant Examiner* — Martin Mushambo
(74) *Attorney, Agent, or Firm* — Canon U.S.A., Inc. IP Division

(57) ABSTRACT

An information processing apparatus and method for controlling printing, the apparatus and method including acquiring printing apparatus identification information for identifying a printing apparatus from a removable medium connected to the information processing apparatus, producing print data to be printed by the printing apparatus using a printer driver compatible with the printing apparatus identified by the printing apparatus identification information, storing the print data produced by the print data production unit on the removable medium.

7 Claims, 17 Drawing Sheets

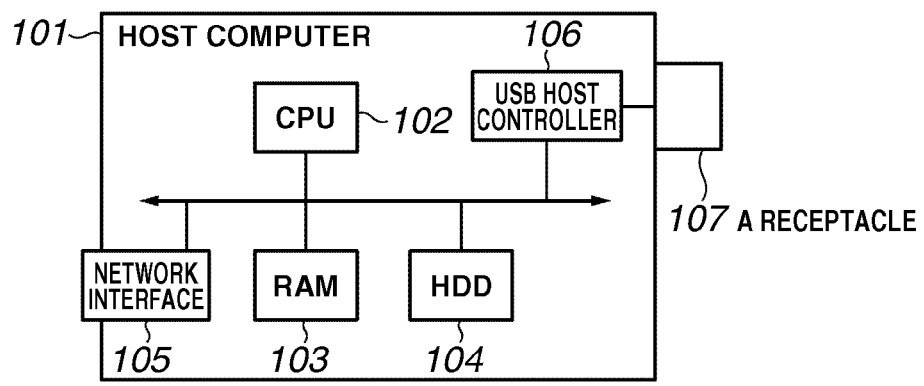
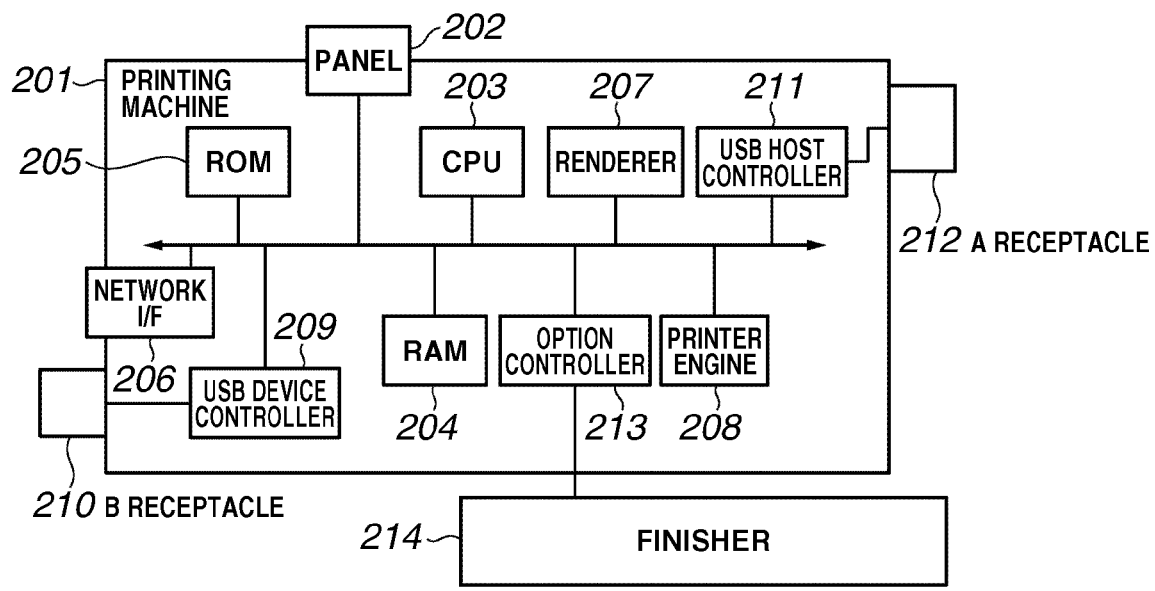
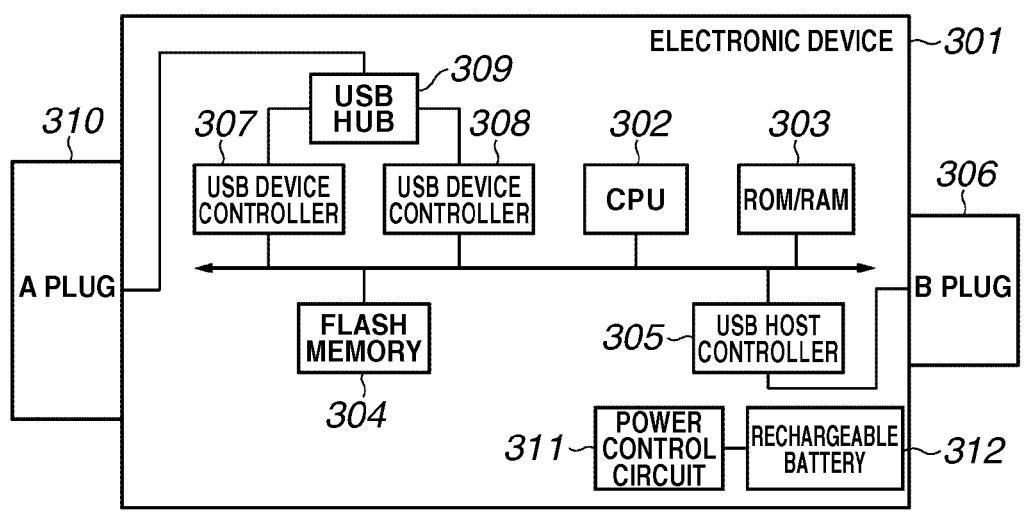

601

```
<ProductName>  LBPxxx  </ProductName>
<VenderName>  Kanon  </VenderName>
<PrinterName>  PRINTING MACHINE 201  </PrinterName>
<IPAddress></IPAddress>

<USBconfFile></USBconfFile>

<ConfigurationFile>  /prc/LBPxxx. conf
</ConfigurationFile>
<DataFile>
   <Data>/prc/data1. prn </Data>
   <Data>/prc/data2. prn </Data>
</DataFile>
```

THIS MEDIUM INCLUDES A PRINT JOB DESTINED FOR ANOTHER PRINTER. THE JOB CAN BE PRINTED BY THIS MACHINE, HOWEVER, SOME OF THE SET FUNCTIONS CAN BE IGNORED IN SOME CASES.

| CONCERNED PRINTER *1102* | TIME *1103* | USER NAME *1104* | JOB NAME *1105* | *1106* | *1107* |
|---|---|---|---|---|---|
| PRINTER AAA | 1/21 10:31 | nao | MATERIAL 1 | PRINT | RESTRICTION DETAILS |
| 192. 168. 2. 1 | 1/22 9:30 | nao | DRAWING 1 | PRINT | RESTRICTION DETAILS |

INFORMATION PROCESSING APPARATUS, PRINTING APPARATUS, ELECTRONIC DEVICE, AND COMPUTER PROGRAM THEREFOR BASED ON EXISTENCE OF PRINTER CONFIGURATION FILE

BACKGROUND OF THE INVENTION

1. Field of the Invention

The present invention relates to an information processing apparatus, a printing apparatus, an electronic device, and a computer program. More specifically, the present invention relates to printing of print data stored in a removable medium.

2. Description of the Related Art

Conventionally, when a printing apparatus performs printing based on an instruction from an information device that is not connected to a network, the information device and the printing apparatus can be mutually connected via a universal serial bus (USB) cable. In addition, a network cable can be temporarily connected to the information device so that the information device can communicate with the printing apparatus via the network. In addition, the information device can be connected to a wireless LAN so that the information device can communicate with the printing apparatus via the network.

The information device referenced above can be one of at least a desktop personal computer (hereinafter referred to as a "PC") a notebook PC, or a mobile device such as a personal digital assistance (PDA).

In mutually connecting a desktop PC and a printing apparatus via a USB cable, if the printing apparatus and the desktop PC are positioned far from each other, the mutual connection between the desktop PC and the printing apparatus via the USB cable can be difficult to establish. In addition, in the case of connecting a notebook PC or a mobile device such as a PDA with a printing apparatus via a USB cable, a user typically needs to carry a USB cable with them at all times. Thus, portability of the mobile device is degraded. In addition, in some cases, a workspace for the mobile device to be placed around the printing apparatus cannot be secured.

In the case of temporarily connecting a network cable to an information device, setting(s) for the network can be complicated because the setting(s) needs to be performed differently depending on environmental conditions. A user typically needs to carry a network cable in this scenario, thus, the portability of a mobile device is degraded. In addition, as described above, in some cases, the workspace for the mobile device to be placed around the printing apparatus cannot be secured.

When connecting an information device to a wireless LAN, the setting(s) for the network can be complicated because the setting(s) needs to be performed differently for each different environment. In some instances, the environment under which the wireless LAN can be used is limited.

In this regard, Japanese Patent Application Laid-Open No. 2005-138531 discusses a technique such that image data produced by an information device is stored on a removable USB memory, and the removable USB memory storing the image data is connected to a printing apparatus.

However, in the case of performing printing by connecting the removable USB memory to the printing apparatus, image data, as well as print data, having a format that is printable by the printing apparatus needs to be produced by the information device to write the image data onto the removable USB memory. More specifically, first, in the case of printing a document produced by an arbitrary application, the document is output from the application to a printer driver to produce an image data file. In this case, an output destination of the printer driver needs to be changed to a given folder by selecting "output to file", instead of a port of the printing apparatus. Thus, the image data file produced by the printer driver is stored in an arbitrary folder in the information device that is selected as the output destination of the file. Then, the removable USB memory is connected to the information device to store the image data file stored in the given folder on the removable USB memory, usually via a user operation. As described above, in the conventional technique, there are a number of procedures a user must go through in order to print by connecting a removable USB memory to a printing apparatus. Inexperienced users typically find this very difficult and frustrating.

SUMMARY OF THE INVENTION

The present invention relates to a mechanism that enables printing of print data stored in a removable medium to be easily performed.

According to an aspect of the present invention, an information processing apparatus having a printer driver for producing print data to be printed by a printing apparatus includes an acquiring unit configured to acquire printing apparatus identification information for identifying a printing apparatus from a removable medium connected to the information processing apparatus, a print data production unit configured to produce print data to be printed by the printing apparatus using a printer driver compatible with the printing apparatus identified by the printing apparatus identification information, and a storage control unit configured to store the print data produced by the print data production unit on the removable medium.

According to another aspect of the present invention, a printing apparatus includes a retrieval unit configured to retrieve printing apparatus identification information for identifying a printing apparatus from a removable medium, a determination unit configured to determine whether the printing apparatus identified by the printing apparatus identification information is identical with a printing apparatus connected to the removable medium, an acquiring unit configured to, when the identified printing apparatus is determined to be identical with the printing apparatus connected to the removable medium, acquire job information that indicates a content of a job concerning print data whose output destination is the printing apparatus from the removable medium, and a printing unit configured to perform printing based on print data corresponding to the job information.

According to yet another aspect of the present invention, an electronic device configured to function as a removable medium having a storage area for storing information includes a production unit configured to produce printing apparatus identification information for identifying a printing apparatus that is mutually connected to the electronic device, a storage control unit configured to store, in the storage area, information that includes the printing apparatus identification information produced by the production unit and print data whose output destination is a printing apparatus that is identified by the printing apparatus identification information, a determination unit configured to determine whether the printing apparatus identification information for identifying the mutually-connected printing apparatus is stored in the storage area, and a sending unit configured to, when the printing apparatus identification information for identifying the mutually-connected printing apparatus is determined by the determination unit to be stored in the storage area, send print data whose output destination is the mutually-connected printing apparatus to the mutually-connected printing apparatus.

According to still yet another aspect of the present invention, a method for controlling printing includes acquiring printing apparatus identification information for identifying a printing apparatus from a removable medium connected to an information processing apparatus having a printer driver for producing print data to be printed by a printing apparatus, producing print data to be printed by the printing apparatus using a printer driver compatible with the printing apparatus, and storing the print data on the removable medium.

According to another aspect of the present invention, a method for controlling printing includes retrieving printing apparatus identification information for identifying a printing apparatus from a removable medium, determining whether the printing apparatus identified by the printing apparatus identification information is identical with a printing apparatus connected to the removable medium, acquiring, from the removable medium, when the identified printing apparatus is determined to be identical with the printing apparatus connected to the removable medium, job information that indicates a content of a job concerning print data whose output destination is the printing apparatus, and performing printing based on print data corresponding to the job information.

According to yet another aspect of the present invention, a method for controlling printing includes producing printing apparatus identification information for identifying a printing apparatus that is mutually connected to an electronic device configured to function as a removable medium having a storage area for storing information, storing, in the storage area, information that includes the produced printing apparatus identification information and print data whose output destination is a printing apparatus that is identified by the printing apparatus identification information, determining whether the printing apparatus identification information for identifying the mutually-connected printing apparatus is stored in the storage area, sending, when the printing apparatus identification information for identifying the mutually-connected printing apparatus is determined to be stored in the storage area, print data whose output destination is the mutually-connected printing apparatus to the mutually-connected printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A through 2C are block diagrams that illustrate an exemplary configuration of each device according to the first exemplary embodiment of the present invention.

FIG. 11 is a diagram that illustrates an example of a screen that indicates that a removable memory device (an electronic device) connected to a printing machine includes print data other than the print data intended to be sent to the printing machine according to the first exemplary embodiment of the present invention.

DETAILED DESCRIPTION OF THE EMBODIMENTS

Various exemplary embodiments, features, and aspects of the present invention will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
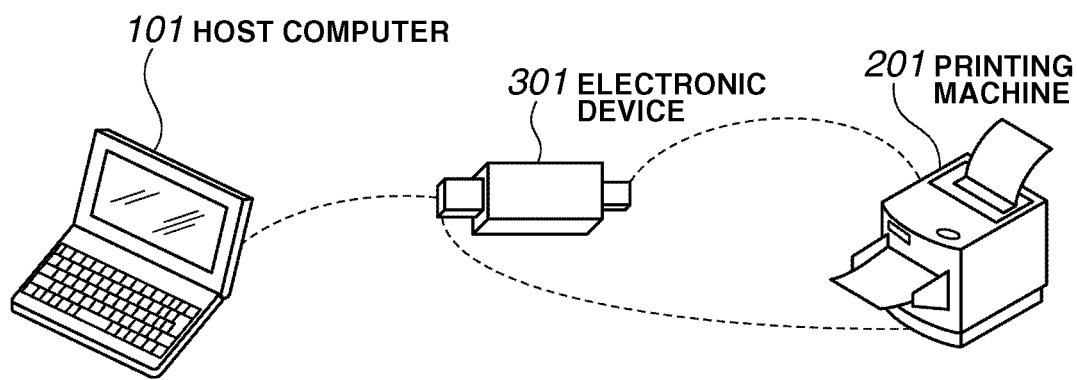
FIG. 1 is a diagram that illustrates an example of a configuration of a printing system according to a first exemplary embodiment of the present invention.

FIG. 1 is a diagram that illustrates an example of a configuration of a printing system according to a first exemplary embodiment of the present invention. Referring to FIG. 1, a host computer 101 has a function as a USB host to which a USB device can be connected. A printing machine 201 is capable of communicating with the host computer 101 via a USB cable. The printing machine 201 has a function as a USB device that receives print data from the host computer.

The printing machine 201 also has a function as a USB host capable of directly reading a print file from a connected USB device when amass storage class USB device (i.e., a USB memory) is connected to the printing machine 201. In addition, the host computer 101 and the printing machine 201 can interactively communicate with each other by being mutually connected via the USB cable. The printing machine 201 can also output print data produced by the host computer 101.

An electronic device 301 is a flash memory that has a mass storage class USB device function and a function as a simple USB host. The electronic device 301 is an example of a portable removable medium. The electronic device 301 includes a USB-compliant A plug for connecting to the USB host and a B plug for connecting to the USB device. The electronic device 301 can be connected to the host computer 101 or the printing machine 201 via the A plug, and can be connected to the printing machine 201 via the B plug.

FIGS. 2A through 2C are block diagrams that illustrate an exemplary configuration of each device. FIG. 2A is a block diagram that illustrates an example of a configuration of the host computer 101. Referring to FIG. 2A, a CPU 102 allows software installed on the host computer 101 to operate. A RAM 103 is a random access storage medium used when the software operating on the CPU 102 stores data or when the software itself operates. A hard disk (HDD) 104 stores application software and application data. In addition, a printer driver that produces print data to be printed by a printing apparatus is stored in the hard disk 104, and the printer driver is deployed on the RAM 103 at the time of operation to be executed by the CPU 102. A network interface 105 is an interface that allows the host computer 101 to communicate with external devices mutually connected to the host computer 101 via a network. A USB host controller 106 controls the communication between the host computer 101 and a USB device (e.g., the printing machine 201 and the electronic device 301) that can be connected to an A receptacle 107.

FIG. 2B is a block diagram that illustrates an example of a configuration of the printing machine 201. Referring to FIG. 2B, a user provides setting information for the printing machine 201 via an operational panel 202. A CPU 203 allows software installed on the printing machine 201 to operate. A RAM 204 is a random access storage medium used when the software operating on the CPU 203 stores data or when the software itself operates. In addition, a printer name (e.g., the name of the printing machine 201) set by the user via the operation panel 202 is stored in the RAM 204. A ROM 205 stores software and font information. The ROM 205 also stores a product name "ABCDEF" and a vendor name "GHIJK", which are specific information of the printing machine 201.

A network interface 206 is an interface that allows the printing machine 201 to communicate with the external devices mutually connected to the printing machine 201 via a network. For example, the network interface 206 receives print data from the external device. A hard renderer 207 produces a raster image by using a display list (DL) produced by the software that operates using the CPU 203 from the print data as an input. A printer engine 208 prints image data produced by the software that operates using the CPU 203 and by the hard renderer 207.

A USB device controller 209 controls the communication between the printing machine 201 and a USB host connected via a B receptacle 210 and a USB cable. The USB device controller 209 is implemented to operate as a USB-compliant printer class function, and is configured by three endpoints. A first endpoint (endpoint 0) supports control transfer, a second endpoint (endpoint 1) supports bulk-out transfer, and a third endpoint (endpoint 2) supports bulk-in transfer. A USB host controller 211 controls the communication between the printing machine 201 and a USB device (e.g., the electronic device 301) that can be connected to an A receptacle 212. A finisher 214 performs post processing of a print product printed by the printer engine 208 under the control of an option controller 213.

FIG. 2C is a block diagram that illustrates an example of a configuration of the electronic device 301, which is a removable medium. Referring to FIG. 2C, a CPU 302 allows software installed on the electronic device 301 to operate. Each of a USB host controller 305, a USB device controller 307, and a USB device controller 308 receives various types of events to control the electronic device 301. A ROM/RAM 303 is a storage area that includes a ROM that stores a program operating using the CPU 302 and a RAM used as a work memory of the CPU 302.

A flash memory 304 is a large-capacity semiconductor memory capable of both reading and writing data and storing the data when the power of the electronic device 301 is turned off. A printer configuration file and a USB configuration file, described below, are stored in a given path of the flash memory 304. The USB host controller 305 controls the communication between the electronic device 301 and a USB device connected to a B plug 306. Note that in the present example, the USB device connected to the B plug 306 has a printer class function. The USB device controller 307 controls the communication between the electronic device 301 and a USB host that is connected via a USB hub 309 and an A plug 310. The USB device controller 307 is implemented to operate as a USB-compliant mass storage class function, and is configured by four endpoints. A first endpoint (endpoint 0) supports control transfer, a second endpoint (endpoint 1) supports bulk-out transfer, a third endpoint (endpoint 2) supports bulk-in transfer, and a fourth end point (end point 3) supports interrupt transfer. The USB device controller 307 provides an area of the flash memory 304 as a file system to a USB host that is currently in communication with the electronic device 301.

The USB device controller 308 controls the communication between the electronic device 301 and a USB host that is connected via the USB hub 309 and the A plug 310. The USB device controller 308 is implemented to operate as a USB-compliant mass storage class function, and is configured by three endpoints. A first endpoint (endpoint 0) supports control transfer, a second endpoint (endpoint 1) supports bulk-out transfer, and a third endpoint (endpoint 2) supports bulk-in transfer.

A power control circuit 311 controls the supply of power to the electronic device 301. When a USB device connects to the B plug 306 and the electronic device 301 operates as a USB host, the power control circuit 311 receives power from a rechargeable battery 312. In this manner, the electronic device 301 receives the power necessary to operate. When a USB host is connected to the A plug 310 and the electronic device 301 operates as a USB device, the power supplied via a power supply line (VBUS) provided to the connected USB host is supplied as the power necessary for the electronic device 301. With the power supplied in this way, the rechargeable battery 312 is charged.

An example of the operation of the electronic device 301 when the electronic device 301 is connected to the host computer 101 is described below with reference to flow charts of FIG. 3A, FIG. 3B, and FIG. 4.

Figure 3A:
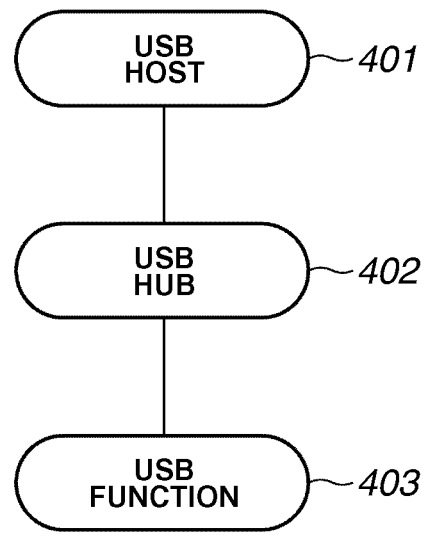
FIG. 3A and FIG. 3B are diagrams that illustrates an example of a state of USB connection established when an A plug provided on an electronic device is connected to an A receptacle of a host computer according to the first exemplary embodiment of the present invention.
Figure 3B:
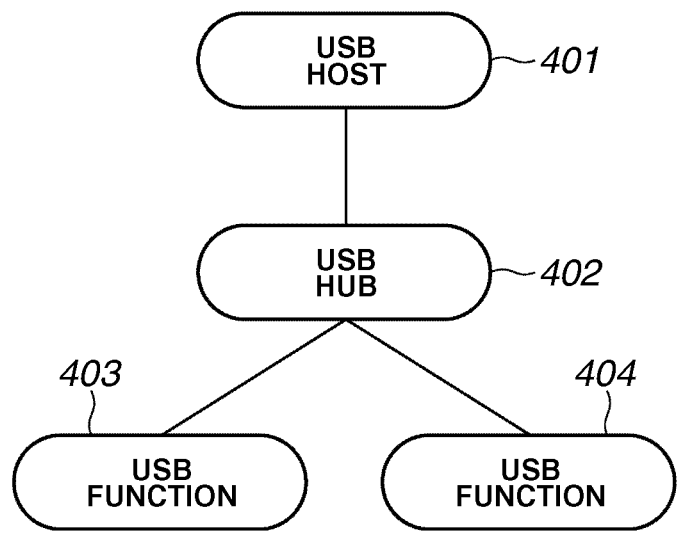

FIG. 3A and FIG. 3B are diagrams that illustrate an example of a state of USB connection established when the A plug 310 provided on the electronic device 301 is connected to the A receptacle 107 of the host computer 101. FIG. 4 is a flow chart that illustrates an example of the operation of the host computer 101 when the host computer 101 is connected to the electronic device 301.

Referring to FIG. 3A and FIG. 3B, a USB host 401 is configured on the USB host controller 106 shown in FIG. 2A. A USB hub 402 is configured on the USB hub 309 shown in FIG. 2C. A mass storage function (USB function) 403 is configured on the USB device controller 307 shown in FIG. 2C. A printer function (USB function) 404 is configured on the USB device controller 308. FIG. 3A is a diagram that illustrates an example of the USB connection that is established when a directory "/_printer" that indicates the printer class is not included in the flash memory 304. FIG. 3B is a diagram that illustrates an example of the USB connection that is established when the directory "/_printer" that indicates the printer class is included in the flash memory 304.

Figure 4:
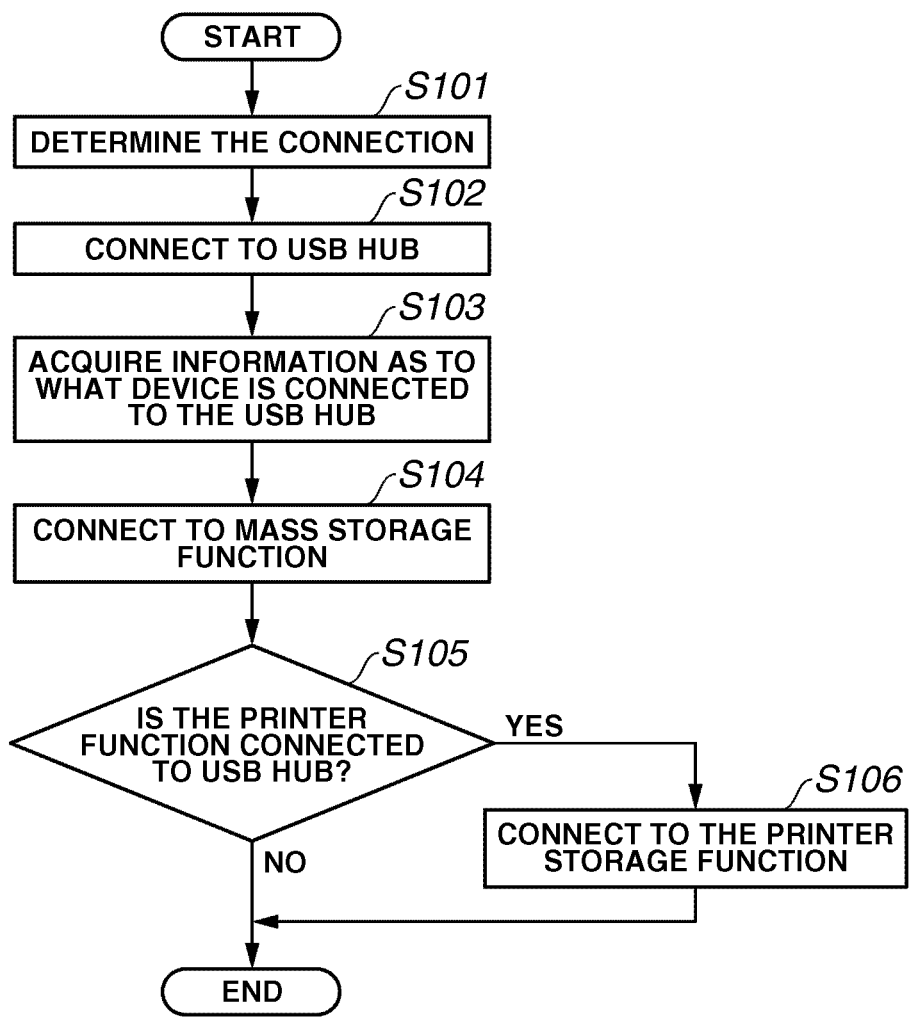
FIG. 4 is a flow chart that illustrates an example of an operation of the host computer when the electronic device is connected to the host computer according to the first exemplary embodiment of the present invention.

Referring to FIG. 4, when the A plug 310 of the electronic device 301 is connected to the A receptacle 107 of the host computer 101, the USB host controller 106 determines the connection (step S101). Then, the USB host controller 106 performs bus enumeration processing compliant with USB standard to establish a connection with the USB hub 309 (step S102). In this state, the connection between the USB host 401 and the USB hub 402 is established. The enumeration processing refers to a series of operations for identifying a device. That is, in the enumeration processing, a device to which the host is connected is identified, an address is designated, and collected descriptor information is fixed.

Then, the USB host controller 106 makes an inquiry to the USB hub 309 as to what device is connected to a downstream port of the USB hub 309 (step S103). Here, the USB hub 309 and the USB device controller 307 are always in a mutually connected state. Thus, the USB hub 309 notifies the USB host controller 106 that the USB device controller 307 is connected. The USB host controller 106, when the USB host controller 106 recognizes that the USB device controller 307 is connected to the USB hub 309, performs the bus enumeration processing so as to establish the connection to the USB device controller 307 (step S104). At this time, the USB host controller 106 recognizes that the function on the USB device controller 307 is a mass storage function. In this way, the USB host 401 and the mass storage function 403 are mutually connected via the USB hub 402 (see FIG. 3A and FIG. 3B).

A state of connection between the USB device controller 308 and the USB hub 309 differs depending on the state of the electronic device 301. When the electronic device 301 is in an initial state, the USB device controller 308 is not connected to the USB hub 309. When the B plug 306 of the electronic device 301 is connected to the B receptacle of the printing machine 201, the CPU 302 produces the directory "/_printer" indicating the printer class on the flash memory 304 and produces a USB configuration file, which is described below. Then, when the directory "/_printer" is produced, the CPU 302 allows the USB hub 309 and the USB device controller 308 to be mutually connected. A description of an operation including processing for producing the directory "/_printer" when the electronic device 301 is connected with the printing machine 201 is provided below with reference to FIG. 8. Note that the USB configuration file is necessary for the USB host controller 106 of the host computer 101 to recognize the electronic device 301 (USB memory) that is connected to the A receptacle 107 as a printer class USB memory. The USB configuration file is an example of environmental information in this embodiment.

When the USB device controller 308 and the USB hub 309 are mutually connected in this manner, the USB hub 309 notifies the USB host controller 106 that the USB device controller 308 is connected to the USB hub 309. Upon recognition of the connection between the USB device controller 308 and the USB hub 309 (Yes in step S105), the USB host controller 106 performs the bus enumeration processing. Then, the USB host controller 106 establishes the connection with the USB device controller 308 (step S106). In the bus enumeration processing, the USB device controller 308 reads a value written in a USB configuration file "/_printer/conf" as a device-dependent value of each descriptor for the USB-compliant printer class, and then sets the read value to the USB device controller 308. Then, the USB device controller 308 notifies the set value to the USB host controller 106.

Here, the device-dependent value for each descriptor refers to, for example, a vendor ID ("idVendor") in a device descriptor. In addition, the device-dependent value for each descriptor includes a product ID ("idProduct") and a number of interfaces ("nNumInterfaces") in a configuration descriptor.

The USB configuration file is a file produced when the B plug 306 of the electronic device 301 is connected to the B receptacle of the printing machine 201. The USB configuration file stores the value acquired from the USB device controller 209 of the printing machine 201. The stored values are written to the flash memory 304 of the electronic device 301. By using the USB configuration file, the USB host controller 106 can recognize that the USB device controller 308 of the electronic device 301 and the USB device controller 209 of the printing machine 201 are the same controllers.

When the bus enumeration processing by each of the USB host controller 106 and the USB device controller 308 is completed, the USB host controller 106 recognizes that the function on the USB device controller 308 is the printer function. In this manner, the USB host 401 and the printer function 404 are mutually connected via the USB hub 402 (see FIG. 3B).

Figure 5:
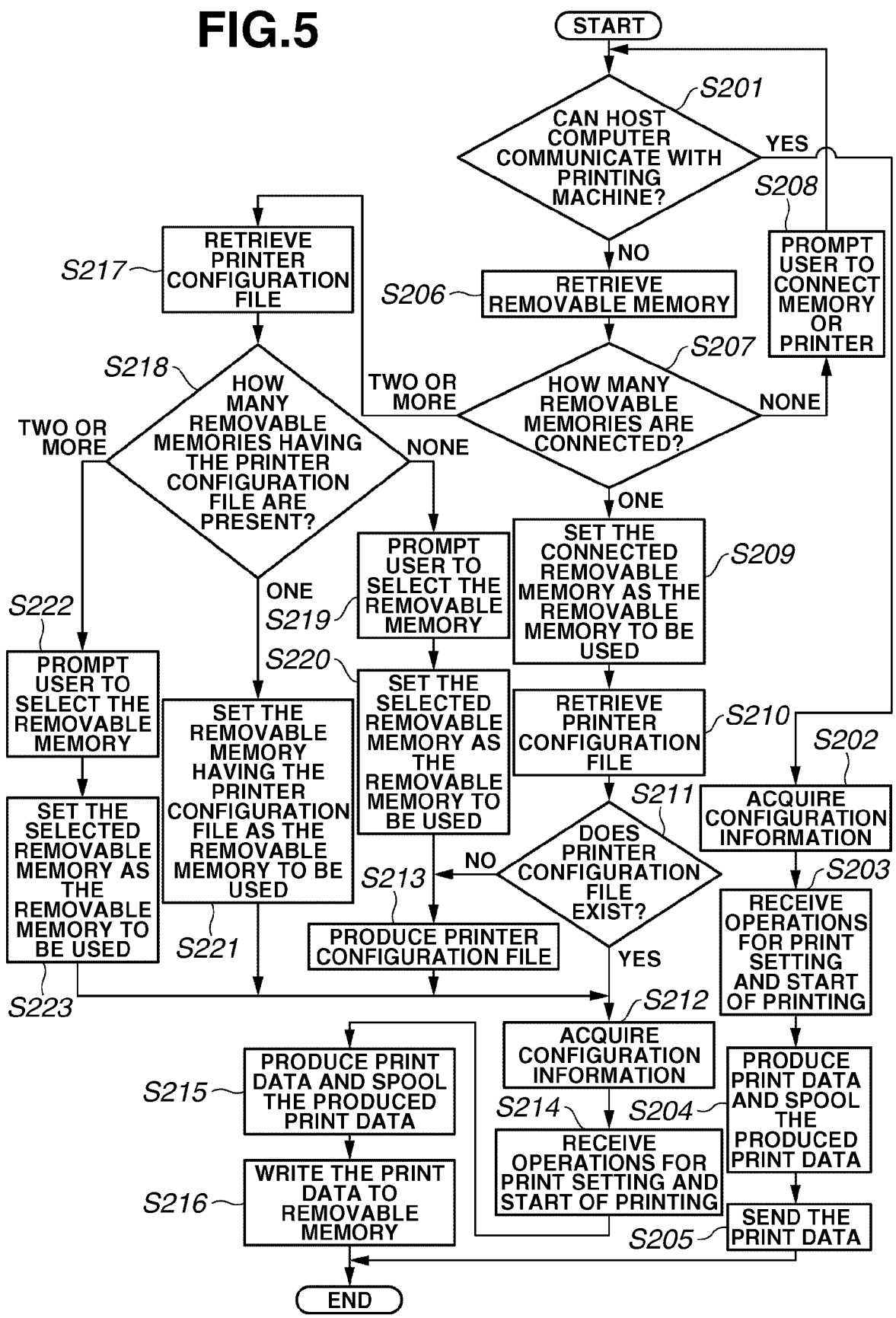
FIG. 5 is a flow chart that illustrates an example of the operation of the host computer when printing is performed by designating a printing machine on the host computer according to the first exemplary embodiment of the present invention.

Next, an example of an operation of the host computer 101 in printing by designating the printing machine 201 by the host computer 101 is described below with reference to the flow chart of FIG. 5.

First, the user activates the printer driver for the printing machine 201 in order to perform printing by designating the printing machine 201 on the host computer 101. Then, the printer driver determines whether the host computer 101 can communicate with the printing machine 201 via the network interface 105 or the USB host controller 106 (step S201). As described above, when the B plug 306 of the electronic device 301 is connected to the B receptacle 210 of the printing machine 201, a USB configuration file is produced in the electronic device 301. Accordingly, when the electronic device 301 that is defined as a printer class in the directory "/_printer" using the USB configuration file is connected to the A receptacle 107, the host computer 101 can recognize that the electronic device 301 is the same as the printing machine 201. Thus, the host computer 101 determines that the host computer 101 can communicate with the printing machine 201. Note that in the determination in step S201, when a port of an output destination of the activated printer driver is a USB port (e.g., the A receptacle 107), it is determined whether the USB memory (i.e., the electronic device 301) is the same as a printer that corresponds to the printer driver.

When it is determined that the host computer 101 can communicate with the printing machine 201 that corresponds to the printer driver or with the electronic device 301 that is recognized to be the same as the printing machine 201 (Yes in step S201), the host computer 101 advances the processing to step S202. In step S202, the printer driver acquires function configuration information of the printing machine 201 from the printing machine 201 or the printer class electronic device 301 via the USB host controller 106. Note that a path of the function configuration information is designated in a printer configuration file. Here, the function configuration information of the printing machine 201 refers to information that indicates a capacity and a state of the printing machine 201.

The function configuration information includes, for example, information concerning the presence or absence of a two-sided printing function, information concerning the presence or absence of a color printing function, information on a finisher, and information concerning the size of paper and the type of a medium that are set to the printing machine 201. Note that upon connection of the electronic device 301 with the host computer 101 or with the printing machine 201, the printer configuration file and the function configuration information are produced. Accordingly, if at least the electronic device 301 has the USB-compliant configuration file and the electronic device 301 is determined to be a printing machine, the printer configuration file and the function configuration information are already produced for the electronic device 301 and are stored in the flash memory 304.

The host computer 101 displays a printer driver setting screen based on the function configuration information acquired in step S202 and receives a command issued by the user for print setting and the start of printing (step S203). Here, the function configuration information is used in performing interdiction processing which prevents selection of the two-sided printing function via the printer driver setting screen if the printing machine 201 does not support the two-sided printing function. When the user performs an operation for starting printing, the printer driver produces print data and spools the print data based on the setting for the printer driver (print setting) performed in step S203 (step S204). The spooled print data is sent to the printing machine 201 or the electronic device 301 via the interface (the A receptacle 107) connected to the printing machine 201 or the printer class electronic device 301 (step S205).

The host computer 101, if it is determined that the host computer 101 cannot communicate with the printing machine 201 or that the electronic device 301 is not the same as the printing machine 201 (No in step S201), searches for a connected removable memory device (step S206). The removable memory device refers to the USB device (the electronic device 301) that is recognized by the USB host controller 106 as the mass-storage device, not the printer class device, or a memory on a PC card that is connected to a PCMCIA interface (not shown). In the processing in step S206 and subsequent steps, the electronic device 301 is treated as the removable memory device that is the mass-storage device, not as the printer class device. The processing in step S207 and subsequent steps differs depending on the number of the connected removable memory devices determined as a result of the search for the removable memory device.

If, in step S207, there is no removable memory device that the host computer 101 can utilize, the host computer 101 displays a message prompting the user to connect a removable memory device to the host computer 101 or to establish a communication with the printing machine 201 (step S208). Then, the processing returns to step S201. At this time, when the electronic device 301 of the printer class is connected, it is determined in step S201 that the host computer 101 can communicate with the printing machine 201 because the electronic device 301 is determined to be the same as the printing machine 301.

If only one removable memory device that the host computer 101 can utilize exists, the host computer 101 sets the connected removable memory device as the removable memory device to be used for printing (step S209). Then, when the connected removable memory device is determined to be a destination of printing out, the host computer 101 checks whether the printer configuration file for the printing machine 201 exists (step S210). Note that when the removable memory device is used for printing for the first time, the printer configuration file does not exist.

Here, when the electronic device 301 is utilized as the memory device that stores print data, the printer configuration file exists as a prefix file of a file ".prc" that exists in a "/prc" directory in the removable memory device. Because the host computer 101 recognizes the electronic device 301 as the printing machine, the printer configuration file is produced in the "/_printer" directory, as described above. In this way, in the present exemplary embodiment, a location of storage (path) in which the printer configuration file is produced differs depending on a behavior of the electronic device 301.

The printer configuration file includes information such as "ProductName" that indicates a product name and "VenderName" that indicates a vender name, as the information for identifying the printing machine 201. In addition, the printer configuration file includes information such as "PrinterName" that indicates a printer name that is unique to the device and "IPAddress" that indicates an IP address that the printing machine 201 uses at the time of connecting to a network. The printer configuration file also includes information such as "ConfigurationFile" that indicates an address (path) of a file that stores the function configuration information of the printing machine 201 and "Datafile" that indicates a group of addresses of the file that stores print data.

In the information "Datafile", zero or more pieces of information "Data" that indicates the address of print data are included. In addition, the printer configuration file includes information "USBconfFile" that indicates the address of the file that stores device-dependent information of each descriptor. Here, the device-dependent information of each descriptor refers to the setting information for a USB device controller.

Figures 6, 7:
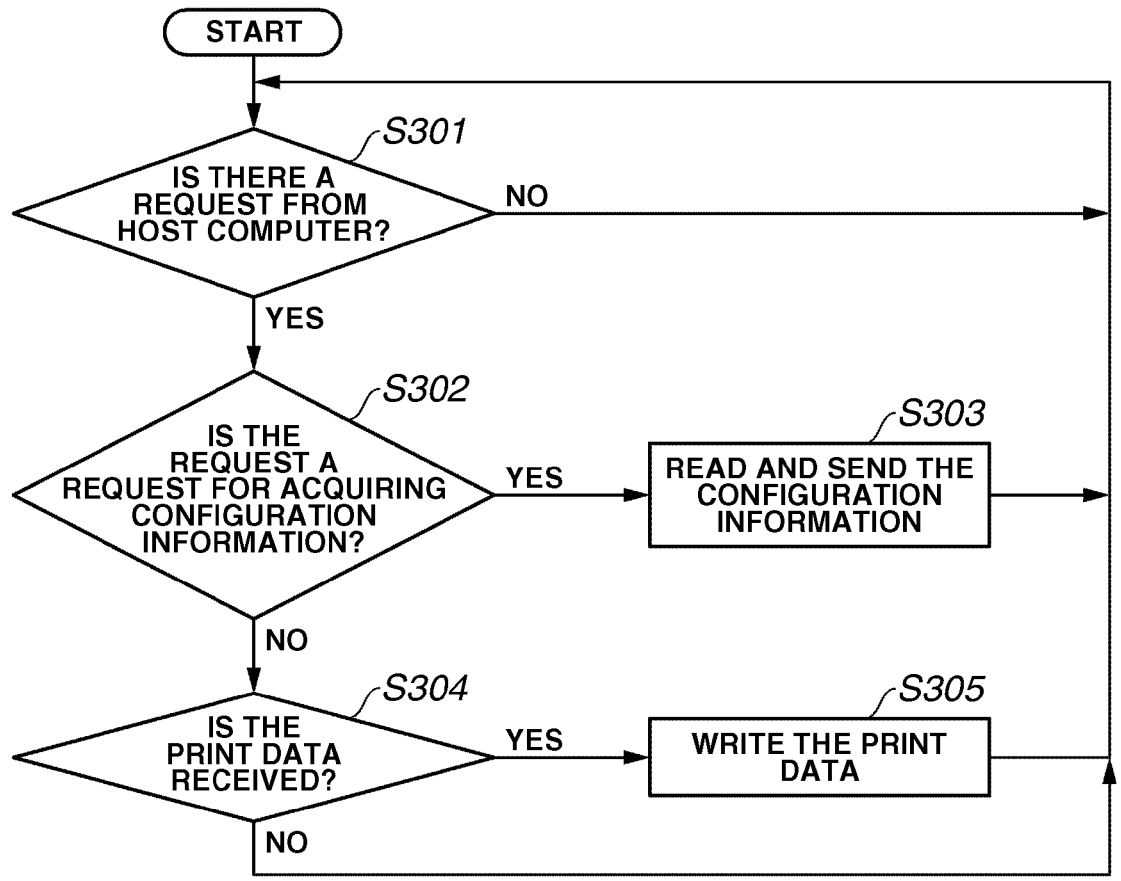
FIG. 6 is a diagram that illustrates an example of a printer configuration file according to the first exemplary embodiment of the present invention.
FIG. 7 is a flow chart that illustrates an example of an operation of the electronic device when a printing machine is designated to perform printing in a state such that the A plug of the electronic device is connected to the A receptacle of the host computer according to the first exemplary embodiment of the present invention.

The host computer 101 refers to the information described above to check the presence or absence of the printer configuration file for the printing machine 201. FIG. 6 illustrates an example of the printer configuration file. For descriptive purposes, a printer configuration file 601 having contents as shown in FIG. 6 exists as "/prc/p201.prc" in the removable memory device. In this case, the product name, the vender name, and the printer name coincide with those of the printing machine 201, and accordingly, it is determined that the printer configuration file for the printing machine 201 exists (Yes in step S211). If a file having the prefix of ".prc" does not exist in the "/prc" directory, or if the information for identifying the printing machine does not coincide with the information concerning the printing machine 201 although the prefix of ".prc" exists in the "/prc" directory, it is determined that the printer configuration file does not exist (No in step S211).

If it is determined that the printer configuration file for the printing machine 201 exists, the host computer 101 refers to "ConfigurationFile" written in the printer configuration file to identify the function configuration information. Then, the host computer 101 reads the file that stores the function configuration information for the printing machine 201 to acquire the function configuration information (step S212).

On the other hand, if it is determined that the printer configuration file for the printing machine 201 does not exist, the host computer 101 newly produces the printer configuration file and the function configuration information file for the removable memory device to be used for printing, which is set in step S209 (step S213). More specifically, the file "/prc/p201.prc" is newly produced as the printer configuration file, and the file "/prc/ABCDEF.conf" is newly produced as the function configuration information file.

For the contents of the printer configuration file that is newly produced, a content "ABCDEF" is set for the item "ProductName"; a content "GHIJK" is set for the item "VenderName"; and a content "name of the printing machine 201" is set for the item "PrinterName", respectively. In addition, when the port of the printing machine 201 is a network port, the IP address that the port indicates is set for the item "IPAddress". On the other hand, when the port of the printing machine 201 is a USB port, no content is set for the item "IPAddress". In addition, a content "/prc/ABCDEF.conf" is set for the item "ConfigurationFile", and no content is set for the item "Datafile".

The item "USBconfFile" includes the information produced by the electronic device 301 when the electronic device 301 is connected to the printing machine 201. In addition, the printer configuration file produced in the "/prc" directory is utilized as a storage device for printing, and accordingly, no content is set for the item "USBconfFile". The newly produced function configuration information file "/prc/ABCDEF.conf" stores the function configuration information (e.g., absence or presence of two-sided printing unit and the color printing function) of the printing machine 201 that the printer driver of the host computer 101 currently has.

When the printer configuration file and the function configuration information file are produced in step S213 as described above, the host computer 101 refers to the content of the item "ConfigurationFile" written in the printer configuration file. Then, the host computer 101 reads the file that stores the function configuration information of the printing machine 201 to acquire the function configuration information (step S212).

Then, the host computer 101 displays a printer driver setting screen based on the function configuration information and receives a command issued by an operation by the user for print setting and the start of printing (step S214). When the user performs the operation for starting the printing, the printer driver produces print data and spools the print data based on the setting for the printer driver (print setting) performed in step S214 (step S215). The spooled print data is newly produced as the file having the prefix of ".prn" in the removable memory device to be used for printing (step S216). The address of the produced file within the removable memory device is written in the item "Datafile" in the printer configuration file for the printing machine 201 while adding the content "Data" thereto.

If it is determined that two or more removable memory devices that the host computer 101 can utilize exist ("two or more" in step S207), the host computer 101 checks the absence or presence of the printer configuration file for the printing machine 201 with respect to each removable memory device (step S217). The processing in step S218 and subsequent steps differs depending on the result of checking of the printer configuration file in step S217 (step S218). If no printer configuration file for the printing machine 201 is found within any removable memory device ("none" in step S218), the host computer 101 displays a screen to prompt the user to select which removable memory device is to be used for printing. Thus, the host computer 101 allows the user to select which removable memory device to use for printing (step S219).

When the user selects the removable memory device in this manner, the host computer 101 sets the selected removable memory device as the removable memory device to be used for printing (step S220), and then the processing advances to step S213 described above.

If it is determined that only one removable memory device that includes the printer configuration file for the printing machine 201 exists ("one" in step S218), the processing advances to step S221. In step S221, the removable memory device is set as the removable memory device to be used for the printing, and then the processing advances to step S212 described above.

If it is determined that two or more removable memory devices that include the printer configuration file for the printing machine 201 exist ("two or more" in step S218), the processing advances to step S222. In step S222, the host computer 101 displays a screen that prompts the user to select which removable memory device that includes the printer configuration file for the printing machine 201 is to use for printing. Thus, the host computer 101 allows the user to select which removable memory device is to use for printing. When the user selects the removable memory device in this manner, the host computer 101 sets the selected removable memory device as the removable memory device to be used for printing (step S223), and then the processing advances to step S212 described above.

Next, an example of an operation of the electronic device 301 is described below with reference to the flow chart of FIG. 7. More specifically, FIG. 7 illustrates an operation when the printing machine 201 is designated to perform printing in a state such that the A plug 310 of the electronic device 301 is connected to the A receptacle 107 of the host computer 101.

As described above, the state of USB connection when the electronic device 301 is connected to the host computer 101 can be either of the two different states shown in FIG. 3A and FIG. 3B. The exemplary operation illustrated in FIG. 7 depicts the electronic device 301 connected to the host computer 301 in the state shown in FIG. 3B, which corresponds to the case where the electronic device 301 is recognized as a printing machine. Note that as described above, in the state shown in FIG. 3B, the B plug 306 of the electronic device 301 needs to be previously connected to the printing machine 201 to previously produce the USB configuration file. In addition, as described above, in the state shown in FIG. 3B, the printer configuration file is stored in the "/_printer" directory.

When the electronic device 301 is connected to the host computer 101, the USB device controller 308 is connected to the USB host 401. In the state shown in FIG. 3B, the CPU 302 waits for an interruption by the USB device controller 308 (step S301). The USB device controller 308, upon receipt of a request from the host computer 101 via the USB, generates an interruption signal to the CPU 302 to request the CPU 302 to process the received request. Then, the CPU 302 makes a determination as to the request from the host computer 101. If the request is determined to be a request for acquiring the function configuration information (Yes in step S302), the processing advances to step S303. On the other hand, if print data is received (Yes in step S304), the processing advances to step S305. If the request is a request other than the requests described above, no processing is performed, and the processing returns to step S301 to wait for an interruption by the USB device controller 308.

In step S303, the CPU 302 reads necessary configuration information from the USB configuration file "/_printer/print.conf" depending on the content of the request for acquiring the function configuration information. Then, the CPU 302 provides the read configuration information to the host computer 101 via the bulk-in endpoint of the USB device controller 308.

In step S305, the sent print data is written in the "/_printer" directory as a new file that has the prefix of ".prn". Then, the name of the produced file is written in the "Datafile" of the printer configuration file "/_printer/print.prc" while adding the content "Data" thereto. The files "/_printer/print.conf" and "/_printer/print.prc" are the files produced when the B plug 306 of the electronic device 301 is connected to the B receptacle of the printing machine 201.

Figure 8:
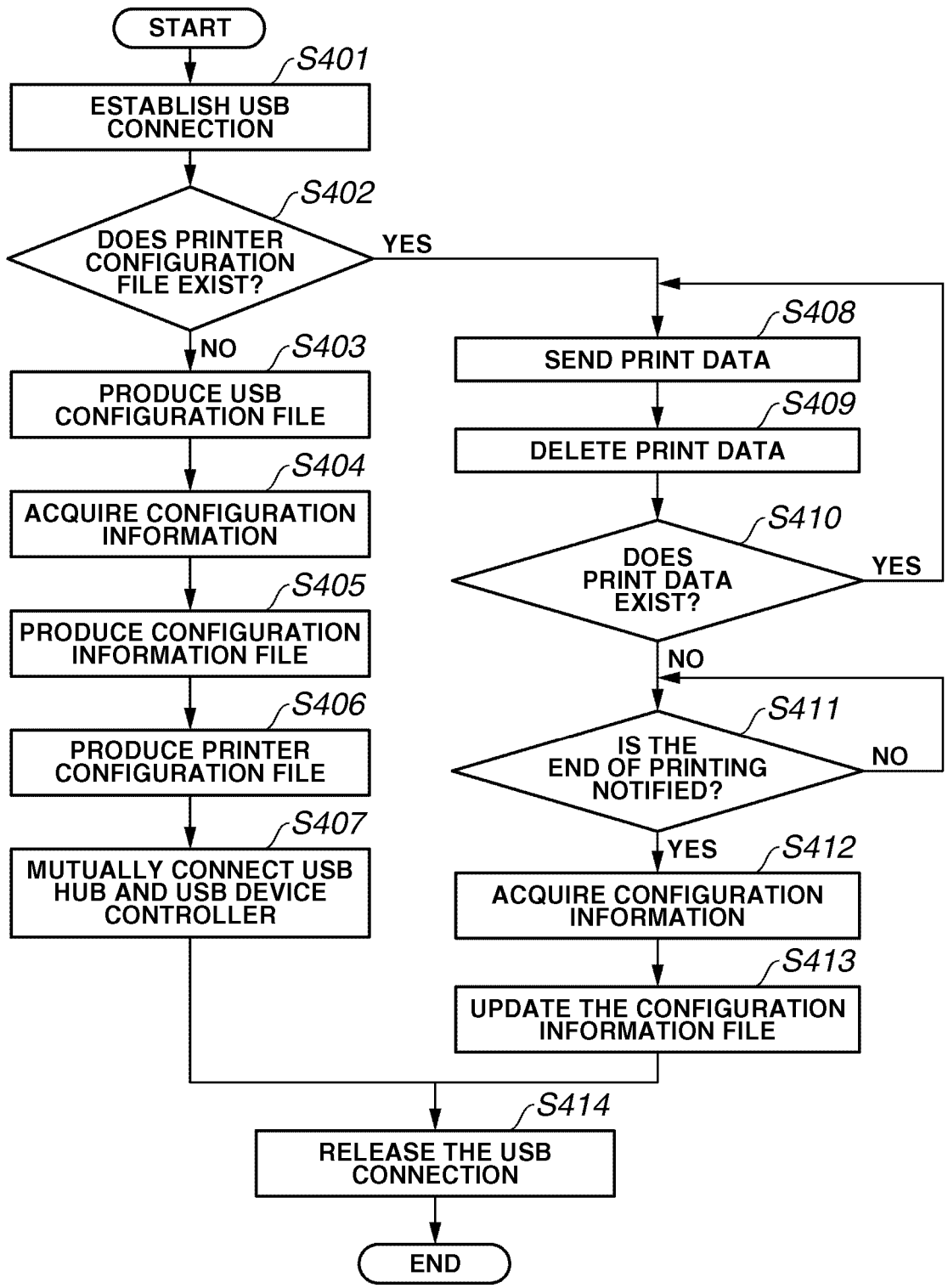
FIG. 8 is a flow chart that illustrates an example of an operation of the electronic device when a B plug of the electronic device is connected to a B receptacle of the printing machine according to the first exemplary embodiment of the present invention.

Next, an example of an operation of the electronic device 301 when the B plug 306 of the electronic device 301 is connected to the B receptacle 210 of the printing machine 201, with reference to FIG. 8., is described.

First, when the B plug 306 of the electronic device 301 is connected to the B receptacle 210 of the printing machine 201, the USB host controller 305 determines the connection. Then, the USB host controller 305 performs bus enumeration processing that is compliant with the USB standard to establish a USB connection (step S401). When the USB connection is established, the USB host controller 305 notifies the CPU 302 that the USB connection is established. Upon receipt of the notification, the CPU 302 checks whether the printer configuration file "/_printer/print.prc" for the printing machine 201 exists in the flash memory 304 (step S402).

If it is determined that no printer configuration file for the printing machine 201 exists (No in step S402), the processing advances to step S403. In step S403, the CPU 302 newly produces the USB-compliant configuration file "/_printer/conf" for the descriptor that includes the device-dependent values among each of the USB-compliant descriptors received by the USB host controller 305. Then, in order to acquire the configuration information of the printing machine 201, the CPU 302 sends a request for acquiring the configuration information to the printing machine 201 via the USB host controller 305 (step S404). When the configuration information is acquired from the printing machine 201, the CPU 302 newly produces the configuration information file "/_printer/print.conf" that includes the acquired configuration information of the printing machine 201 (step S405). Then, the CPU 302 produces a printer configuration file "/_printer/print.prc" for the printing machine 201 (step S406). After that, the USB hub 309 and the USB device controller 308 are mutually connected (step S407). Then, the USB connection is released (step S414), and the processing ends.

For the contents of the printer configuration file that is newly produced, the content "ABCDEF" is set for the item "ProductName"; the content "GHIJK" is set for the item "VenderName"; and the content "name of the printing machine 201" is set for the item "PrinterName", respectively. These values are the values that the USB host controller 305 receives from the printing machine 201. In addition, if the printing machine 201 is connected to the network, the IP address that the network port indicates is set for the item "IPAddress". On the other hand, if the printing machine 201 is not connected to the network, no content is set for the item "IPAddress". In addition, a content "/_printer/print.conf" is set for the item "ConfigurationFile", and no content is set for the item "Datafile". The content "/_printer/conf" is set for the item "USBconfFile".

If it is determined in step S402 that the printer configuration file for the printing machine 201 exists, the electronic device 301 checks the content that is set for the item "Datafile" in the printer configuration file. Then, the electronic device 301 repeats the processing in steps S408 through S410 until no set print data remains. More specifically, the electronic device 301 reads one file that stores print data designated by a "Data" tag in the information "Datafile" and sends the read file to the printing machine 201 (step S408). When all the print data included in the printer configuration file is sent to the printing machine 201, the electronic device 301 deletes the printer configuration file that includes the sent print data and deletes an entry of the file in the item "Datafile" (step S409). When all the print data designated by the "Data" tag in the item "Datafile" is completely sent (No in step S410), the electronic device 301 waits until the end of the printing is notified from the printing machine 201 (step S411). When the end of the printing of all the sent print data is notified from the printing machine 201, the electronic device 301 sends a request for acquiring the configuration information to the printing machine 201 via the USB host controller 305 in order to acquire the configuration information of the printing machine 201 (step S412). When the configuration information is acquired from the printing machine 201, the electronic device 301 updates the configuration information file set in the item "ConfigurationFile" of the printer configuration file with the acquired configuration information (step S413). Then, the USB connection is released (step S414), and the processing ends.

Figure 9:
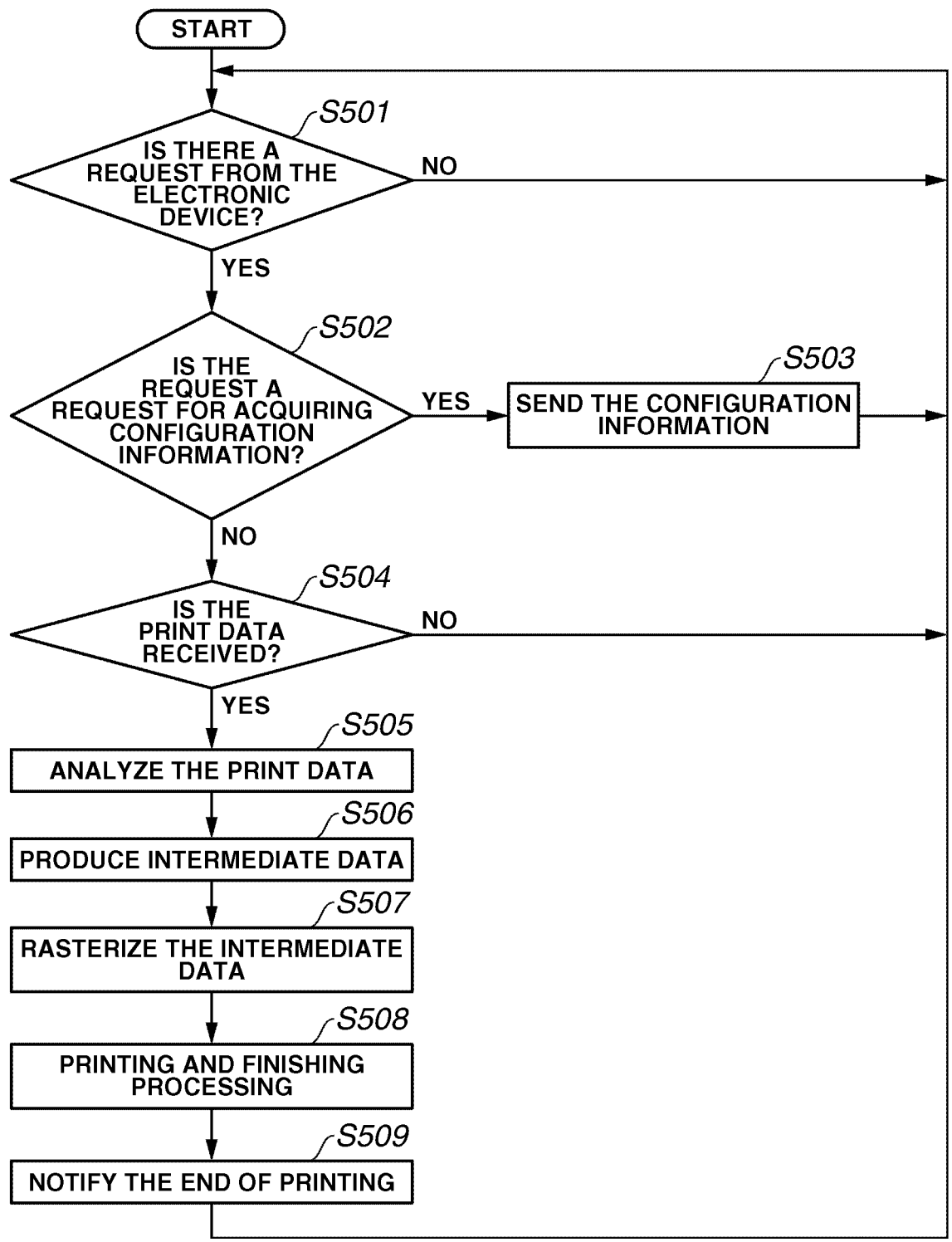
FIG. 9 is a flow chart that illustrates an example of the operation of the printing machine when the B plug of the electronic device is connected to the B receptacle of the printing machine according to the first exemplary embodiment of the present invention.

Next, an example of an operation of the printing machine 201 when the B plug 306 of the electronic device 301 is connected to the B receptacle 210 of the printing machine 201 is described below with reference to FIG. 9.

When the B plug 306 of the electronic device 301 is connected to the B receptacle 210 of the printing machine 201, a USB connection is established by the bus enumeration processing of the USB host controller 305. Then, the printing machine 201 waits until a request from the electronic device 301, which serves as a host, is received (step S501).

The USB device controller 209, upon receipt of the request from the electronic device 301 via the USB, generates an interruption signal to the CPU 203 to request the CPU 203 to process the received request. Then, the CPU 203 makes several determinations regarding the request from the electronic device 301 (step S502 and step S504). If the request is determined to be a request for acquiring the configuration information (Yes in step S502), the processing advances to step S503. On the other hand, if print data is received (Yes in step S504), the processing advances to step S505. If the request is a request other than the requests described above, no processing is performed by the CPU 203, and the processing returns to step S501 to wait for an interruption by the USB device controller 209.

If the processing advances to step S503, the CPU 203 confirms at least one state from among the states, such as the state of the RAM 204, the state of the printer engine 208, and the state of the option controller 213, depending on the content of the request for acquiring the configuration information. Then, the CPU 203 produces necessary configuration information based on the confirmed state. The configuration information is provided to the electronic device 301 via the bulk-in endpoint of the USB device controller 209.

If the processing advances to step S505, the CPU 203 analyzes the received print data, and rewrites the data in the RAM 204 and performs the setting for the printer engine 208 and the option controller 213, depending on the content of the analyzed print data (step S505). Then, the CPU 203 produces intermediate data of a format by which the intermediate data can be rendered by hardware at a high speed (step S506). Note that the format of the intermediate data is implemented by a known technique, and accordingly, a detailed description thereof is omitted here.

The renderer 207 renders the produced intermediate data to convert the intermediate data into raster data (step S507). The printer engine 208 prints the raster data on a paper sheet designated by the user. The finisher 214 performs a finishing processing on the printed paper sheet (step S508). When the CPU 203 determines that the print processing ends, based on the data sent by the processing in steps S506 through S508, the CPU 203 issues a notification of the end of the printing to the electronic device 301 via the USB device controller 209. In the above description, the electronic device 301 is connected to the B receptacle 210 of the printing machine 201. However, the operation described above is applicable even when the host computer 101 is connected to the B receptacle 210 of the printing machine 201.

Figure 10:
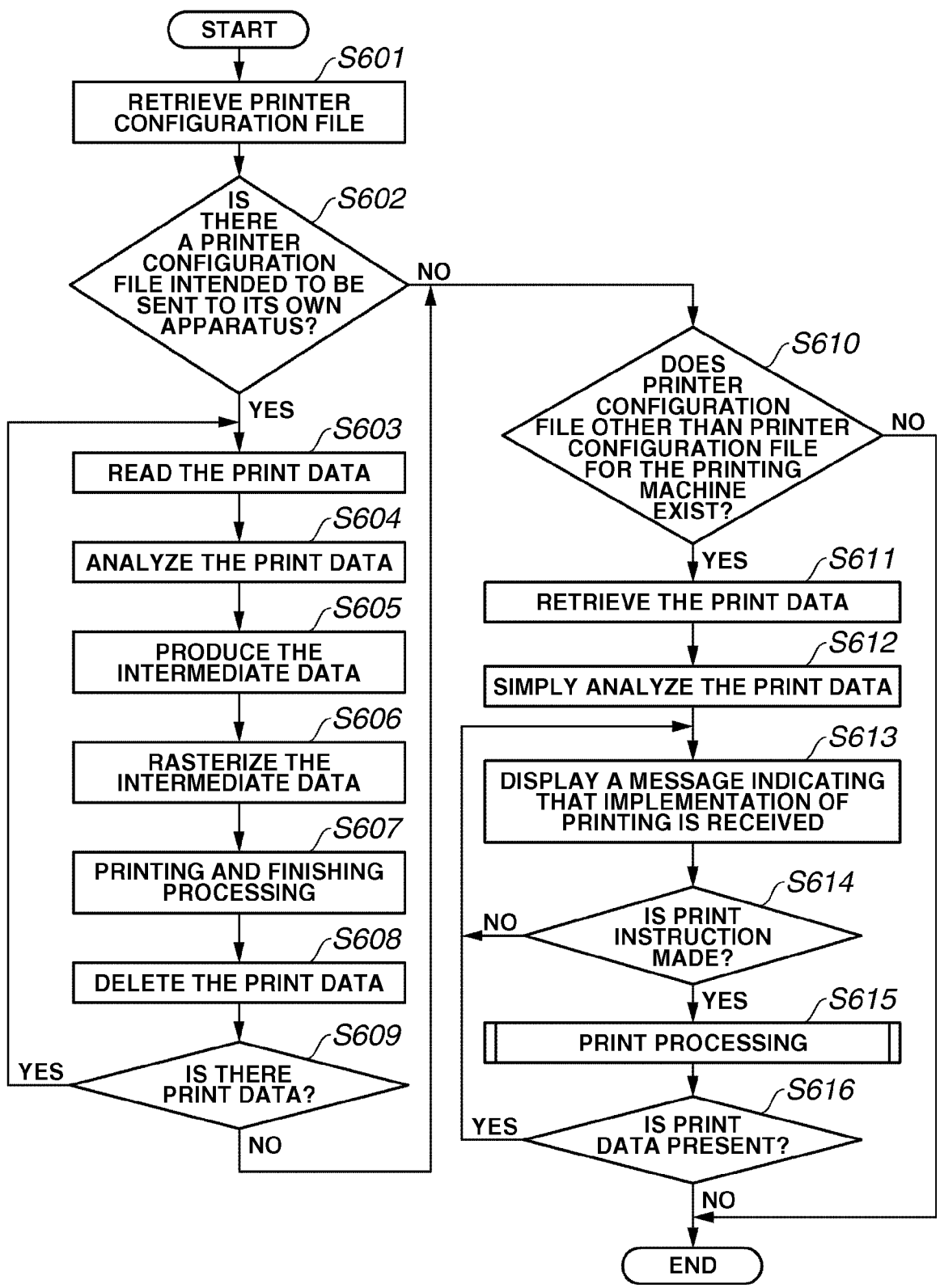
FIG. 10 is a flow chart that illustrates an example of the operation of the printing machine when the A plug of the electronic device is connected to the A receptacle of the printing machine according to the first exemplary embodiment of the present invention.

Next, an example of an operation of the printing machine 201 when the A plug 310 of the electronic device 301 is connected to the A receptacle 212 of the printing machine 201 is described below with reference to the flow chart of FIG. 10. Note that the processing as described below corresponds to both the case where the electronic device 301 is utilized as a storage device for printing and the case where the electronic device 301 is recognized as the printing machine 201 and stores print data.

When the A plug 310 of the electronic device 301 is connected to the A receptacle of the printing machine 201, the USB host controller 211 determines the connection and then performs bus enumeration processing to establish a USB connection. The USB host controller 211 then recognizes the electronic device 301 as a USB-compliant mass storage device. When the USB connection with the electronic device 301 is established, the USB host controller 211 generates an interruption signal to the CPU 203 and notifying the CPU 203 that the USB connection with the electronic device 301 is established. Upon receipt of the notification, the CPU 203 searches for the printer configuration file that includes the prefix of ".prc" from the directory "/_printer" and/or the directory "/prc" in the flash memory 304 (step S601). Then, the CPU 203 searches the content of the printer configuration file found by the search to determine whether the printer configuration file for the printing machine 201 exists (step S602). In the present example, where the printer configuration file for the printing machine 201 exists, the items "ProductName", "VenderName", "PrinterName", and "IPAddress" in the printer configuration file are the same as the content of the information that the printing machine 201 has.

Note that when only the items "ProductName" and "VenderName" are the same as the content of the information that the printing machine 201 has, the printer configuration file for the printing machine 201 can be determined to exist.

Next, the CPU 203 confirms the content of the setting for the item "Datafile" in the printer configuration file for the printing machine 201, and then repeats the processing in steps S603 through S609 until no set print data remains. More specifically, the CPU 203 reads one file that stores the print data designated by the "Data" tag in the item "Datafile" (step S603). Then, the CPU 203 analyzes the read print data, depending on the content of the analyzed print data, rewrites the data in the RAM 204 and performs the setting for the printer engine 208 and the option controller 213 (step S604). Then, the CPU 203 produces intermediate data (step S605).

The renderer 207 renders the produced intermediate data to convert the intermediate data into raster data (step S606). The printer engine 208 prints the raster data on a paper sheet designated by the user, and the finisher 214 performs finishing processing on the printed paper sheet (step S607). The CPU 203 deletes the file read in step S603 and deletes an entry of the file in the information "Datafile" in the printer configuration file (step S608).

When all the print data designated by the "Data" tag in the item "Datafile" are completely printed (No in step S609), the CPU 203 determines whether a printer configuration file other than the printer configuration file for the printing machine 201 exists (step S610). If it is determined that no printer configuration file other than the printer configuration file for the printing machine 201 exists, the processing ends. On the other hand, if it is determined that a printer configuration file other than the printer configuration file for the printing machine 201 exists, the CPU 203 refers to the content of the printer configuration file other than the printer configuration file for the printing machine 201. Then, the CPU 203 searches all the print data included in the printer configuration file, namely, all the print files that are designated by the "Data" tag in the item "Datafile" of each printer configuration file (step S611).

Next, the CPU 203 performs an analysis of each searched print data to acquire various kinds of print information, such as a job name, a production date and time, a name of the user who produced the print data, the absence or presence of a two-sided printing setting, a color setting, a finishing setting, etc. which are included in each print data (step S612). Then, the CPU 203 displays on the operation panel 202 an outline of the various print information acquired in step S612 for each print data searched in step S611 (step S613). Thus, it is indicated to the user that the removable memory device (i.e., the electronic device 301) connected to the printing machine 201 includes print data other than the print data intended to be sent to the printing machine 201.

FIG. 11 is a diagram that illustrates an example of a screen that displays that the removable memory device (i.e., the electronic device 301) connected to the printing machine 201 includes print data other than the print data intended to be sent to the printing machine 201. Referring to FIG. 11, a message 1101 is displayed notifying the user that the connected removable memory includes print data other than the print data intended to be sent to the printing machine 201, and that the printing machine 201 can print the print data, but the print data can be ignored in some cases. A column for each of a concerned printer 1102 indicates the information, a time 1103, a user name 1104, and a job name 1105, concerning the various print information acquired in step S612. The print information acquired in step S612 and displayed in message 1101 is not limited to that described above, and any print related information that would enable practice of the present invention is applicable.

More specifically, the column for the concerned printer 1102 depicts which printing machine is to be used for printing print data. The concerned printer column 1102 displays items such as the "PrinterName" or "IPAddress" in the printer configuration file in which the entry of the print data is included. The column for the time 1103 displays the time at which the print data was produced, the column for the user name 1104 displays the user who produced the print data, and the column for the job name 1105 displays the job name of the print data. The information indicated by each of these items is the information included in the print data.

In the example shown in FIG. 11, there are two print data included in the removable memory device (i.e., the electronic device 301). The two print data are the data produced with the intent to print using the printing machine "printer AAA" and the printing machine whose IP address is "192.168.2.1", respectively.

The user generates an instruction to print the concerned print data by the printing machine 201 by selecting a button 1106. In addition, when the user selects a button 1107, detailed information of a function that is restricted when the concerned print data is printed by the printing machine 201 is displayed.

Figure 12:
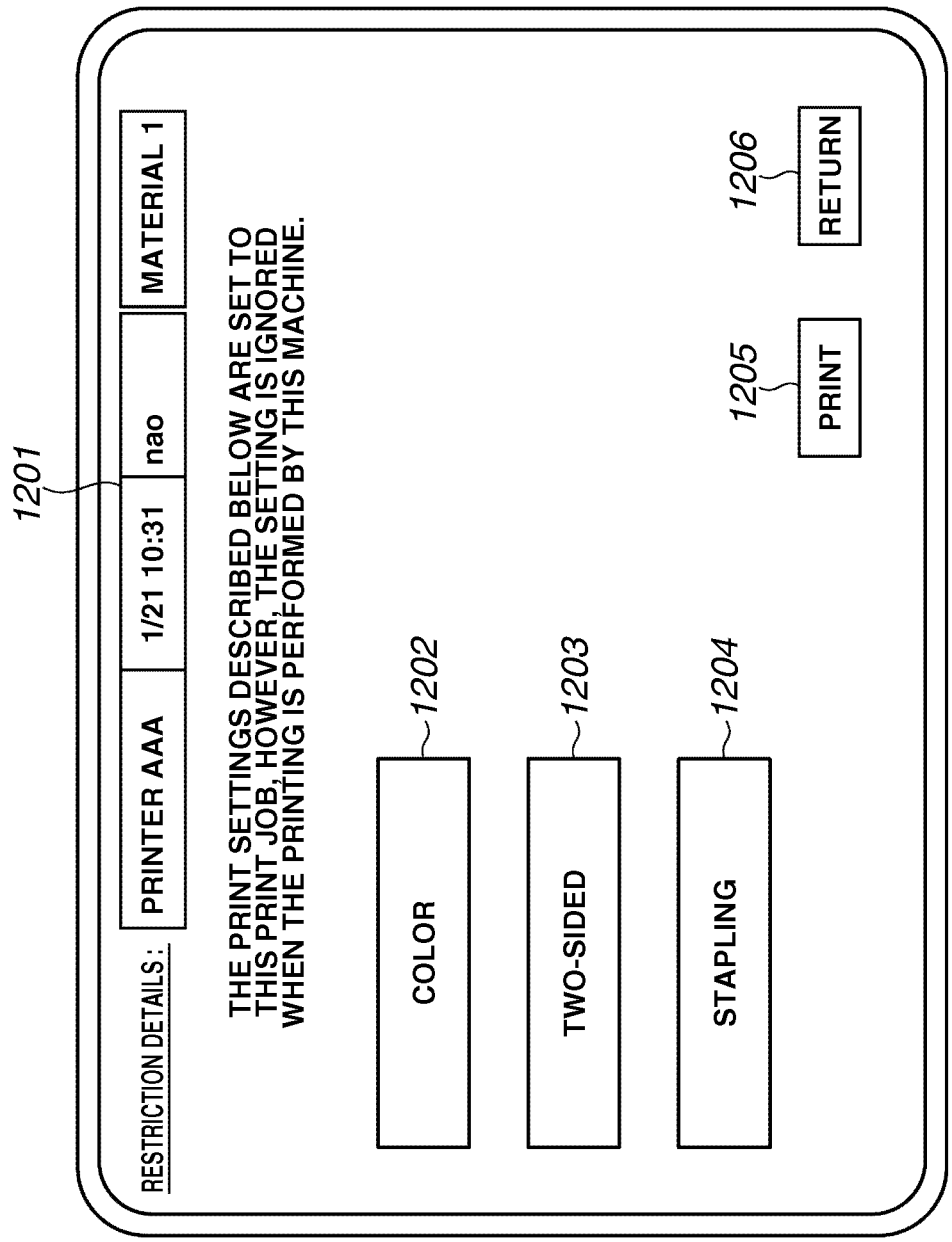
FIG. 12 is a diagram that illustrates an example of a screen that displays a function restricted by printing concerned print data with the printing machine according to the first exemplary embodiment of the present invention.

FIG. 12 is a diagram that illustrates an example of a screen displayed when the user selects the button 1107, which indicates a function restricted when the concerned print data is printed by the printing machine 201. Included in FIG. 12 are restriction details 1201 and restricted function display columns 1202 through 1204 for the print data selected by the user The restriction details 1201 contains the same information displayed in columns 1102 through 1105 of FIG. 11. The restricted function display column 1202 indicates that the setting for color printing is ignored and monochromatic printing is performed. The restricted function display column 1203 indicates that the setting for two-sided printing is ignored and one-sided printing is performed. The restricted function display column 1204 indicates that the setting for stapling is ignored and stapling is not performed. The user can select a button 1205 to instruct printing of concerned print data. In addition, when the user selects a button 1206, the screen returns to the screen shown in FIG. 11.

Referring back to FIG. 10, when the user selects the button 1106 or the button 1205 to instruct printing of print data (Yes in step S614), the printing machine 201 performs print processing of the concerned print data (step S615). The print processing is similar to the processing describe above in steps S603 through S608, and thus a detailed description thereof is omitted herein.

After the print processing is performed, the CPU 203 determines whether any print data retrieved in step S611 that has not yet been subjected to the print processing exists (step S616). If it is determined that print data does not exist, the processing ends. On the other hand, if print data exists, the processing returns to step S613 to display the screen shown in FIG. 11 again. At this time, print data that has been printed is deleted from a list displayed on the screen.

As described above, in the present exemplary embodiment, when the B plug 306 of the electronic device 301 is connected to the B receptacle 210 of the printing machine 201, the electronic device 301 operates as a USB host. More specifically, the electronic device 301 acquires configuration information of the printing machine 201 from the printing machine 201. In this case, as viewed from the printing machine 201, the electronic device 301 operates the same as the host computer 101.

In addition, when the A plug 310 of the electronic device 301 is connected to the A receptacle 107 of the host computer 101, the electronic device 301 operates as a printer function device. That is, the host computer 101 recognizes that the electronic device 301 and the printing machine 201 are the same. Accordingly, the state in this case is the same as the state such that the printing machine 201 is connected to the host computer 101. Accordingly, when the user performs the same operation on the host computer 101 for printing to the printing machine 201, print data is stored in the electronic device 301.

In the state in which the print data is stored in the electronic device 301 in this manner, the user disconnects the electronic device 301 from the host computer 101 and then connects the electronic device 301 to the B receptacle 210 of the printing machine 201. Then, the electronic device 301 sends the stored print data to the printing machine 201, so that the printing machine 201 automatically performs printing. To perform printing of different print data using the electronic device 301, the user re-connects the electronic device 301 to the host computer 101 and performs another printing operation before connecting the electronic device 301 to the printing machine 201.

That is, as viewed from the user, with respect to the operation via the host computer 101, printing can be performed by performing the same operation as the operation performed when the host computer 101 and the printing machine 201 are mutually connected via a network or a USB cable. In addition, the operation of the host computer 101 and the operation of the printing machine 201 are the same as an ordinary operation, and accordingly, printing can be performed under an existing printing environment via the electronic device 301.

In addition, when the electronic device 301 is connected to the host computer 101 in a state in which the host computer 101 has never been connected with the printing machine 201, the electronic device 301 operates as a USB-compliant mass storage class device. In this case, the user can store print data on the electronic device 301 by the same operation via the host computer 101 as an ordinary printing operation. Then, when the A plug 310 of the electronic device 301 is connected to the A receptacle 212 of the printing machine 201, the printing machine 201 operates as a USB host. More specifically, the printing machine 201 retrieves the print data from the electronic device 301 to automatically perform printing of the print data.

That is, as viewed from the user, with respect to the operation on the host computer 101, the user can perform printing by the same operation as the operation performed when the host computer 101 and the printing machine 201 are mutually connected via a network or a USB cable. In addition, because the electronic device 301 manages a sending destination of the print data by using the printer configuration file, the print data intended to be sent to the printing machine 201 can be automatically printed even under the print environment in which a plurality of printing machines are provided. On the other hand, with respect to print data that is not intended to be sent to the printing machine 201, the printing machine 201 makes an inquiry to the user. Thus, if the user intends to print the print data that is not intended to be sent to the printing machine 201, the printing machine 201 can print the print data. In addition, in the present exemplary embodiment, the electronic device 301 not only can be used as a storage device for printing, but can also be recognized as a printing machine by the printer driver to receive print data.

Second Exemplary Embodiment

A second exemplary embodiment of the present invention will now be described. In the first exemplary embodiment, one printing machine 201 is connected to the electronic device (removable memory device) 301. In the second exemplary embodiment, a plurality of printing machines is connected to the electronic device. That is, the first exemplary embodiment and the second exemplary embodiment differ from each other in the number of printing machines connected to the electronic device and in a part of the configuration of the electronic device 301. Accordingly, in the description below, with respect to components and portions similar to those described in the first exemplary embodiment, the reference numerals in FIGS. 1 through 12 are the same, and a detailed description thereof is omitted.

Figure 13:
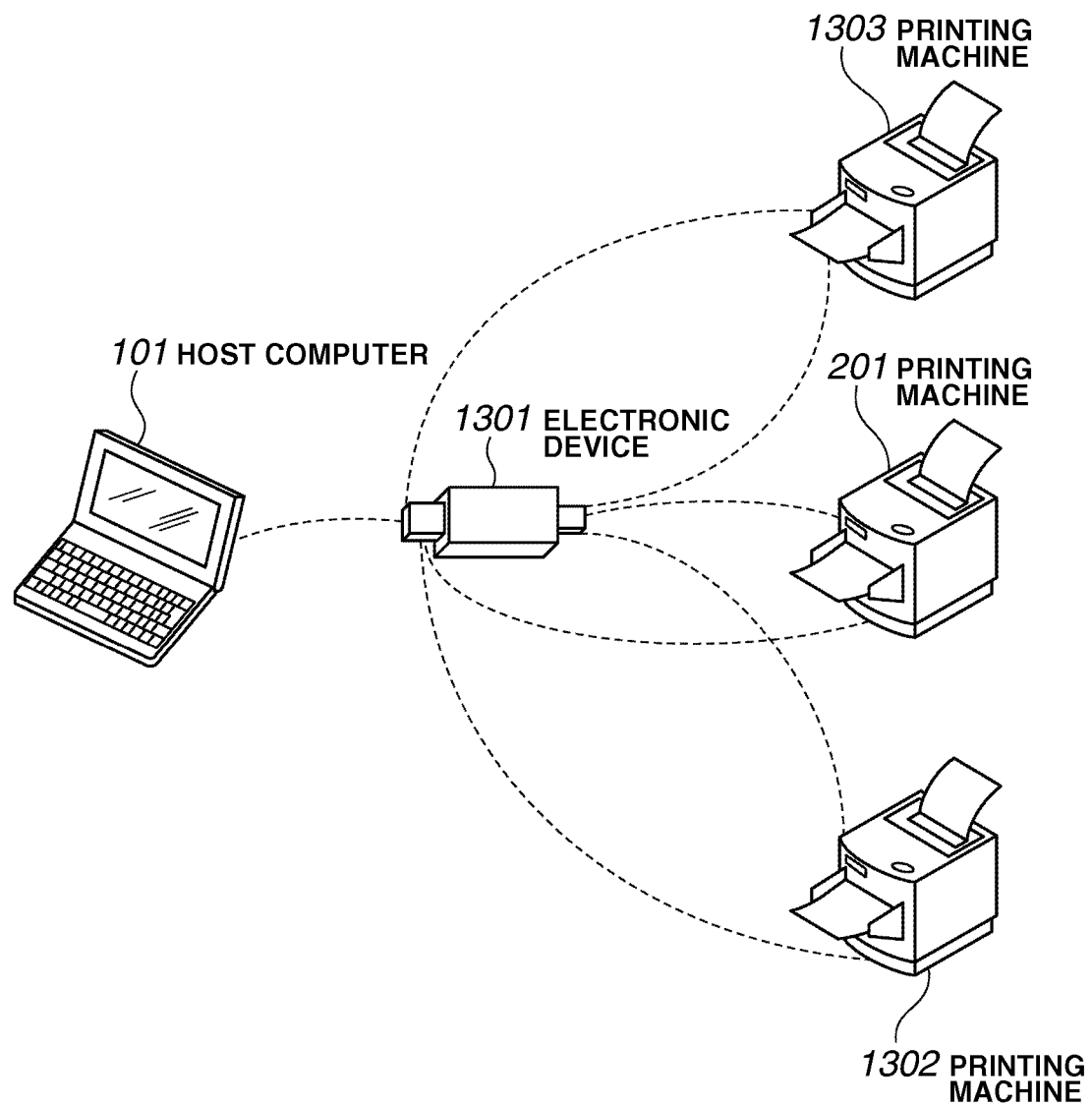
FIG. 13 is a diagram that illustrates an example of a configuration of a printing system according to a second exemplary embodiment of the present invention.
Figure 14:
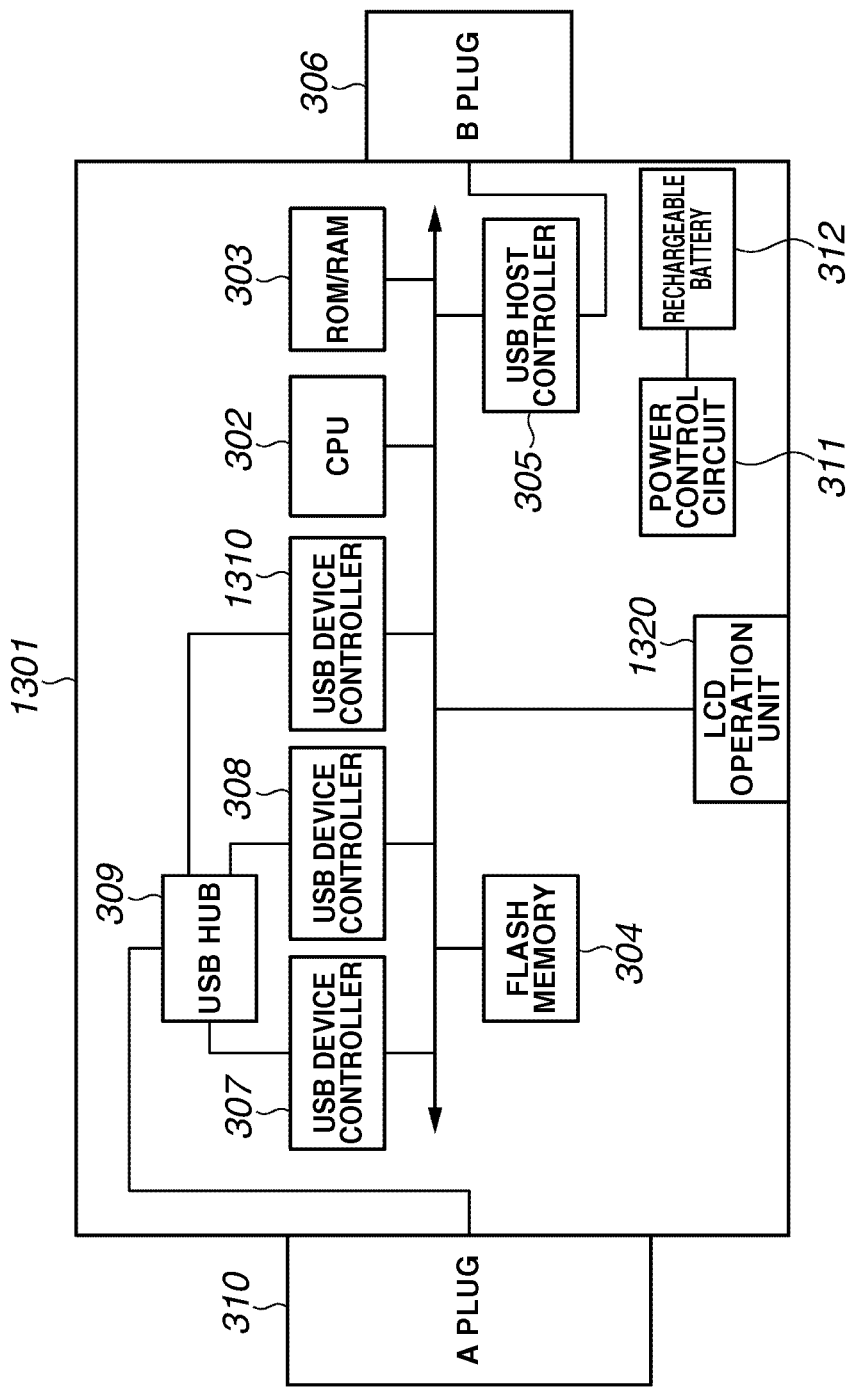
FIG. 14 is a diagram that illustrates an example of a configuration of an electronic device according to the second exemplary embodiment of the present invention.

FIG. 13 is a diagram illustrating an example of a configuration of a printing system. Referring to FIG. 13, the host computer 101 and the printing machine 201 have similar configurations as those in the first exemplary embodiment. An electronic device 1301 has an exemplary configuration illustrated in FIG. 14. The electronic device 1301 is different from the electronic device 301 in the first exemplary embodiment only in that it includes a USB device controller 1310 and an LCD operation unit 1320, which are not included in the electronic device 301.

The USB device controller 1310 has a similar configuration as that of the USB device controller 308. The USB device controller 1310 is implemented to operate as a USB-compliant printer class function and is configured by three endpoints. A first endpoint (endpoint 0) supports control transfer, a second endpoint (endpoint 1) supports bulk-out transfer, and a third endpoint (endpoint 2) supports bulk-in transfer. Printing machines 1302 and 1303 have a similar configuration as that of the printing machine 201. The LCD operation unit 1320 is a user interface that includes an LCD screen, enables user operation, and displays messages.

Figure 15:
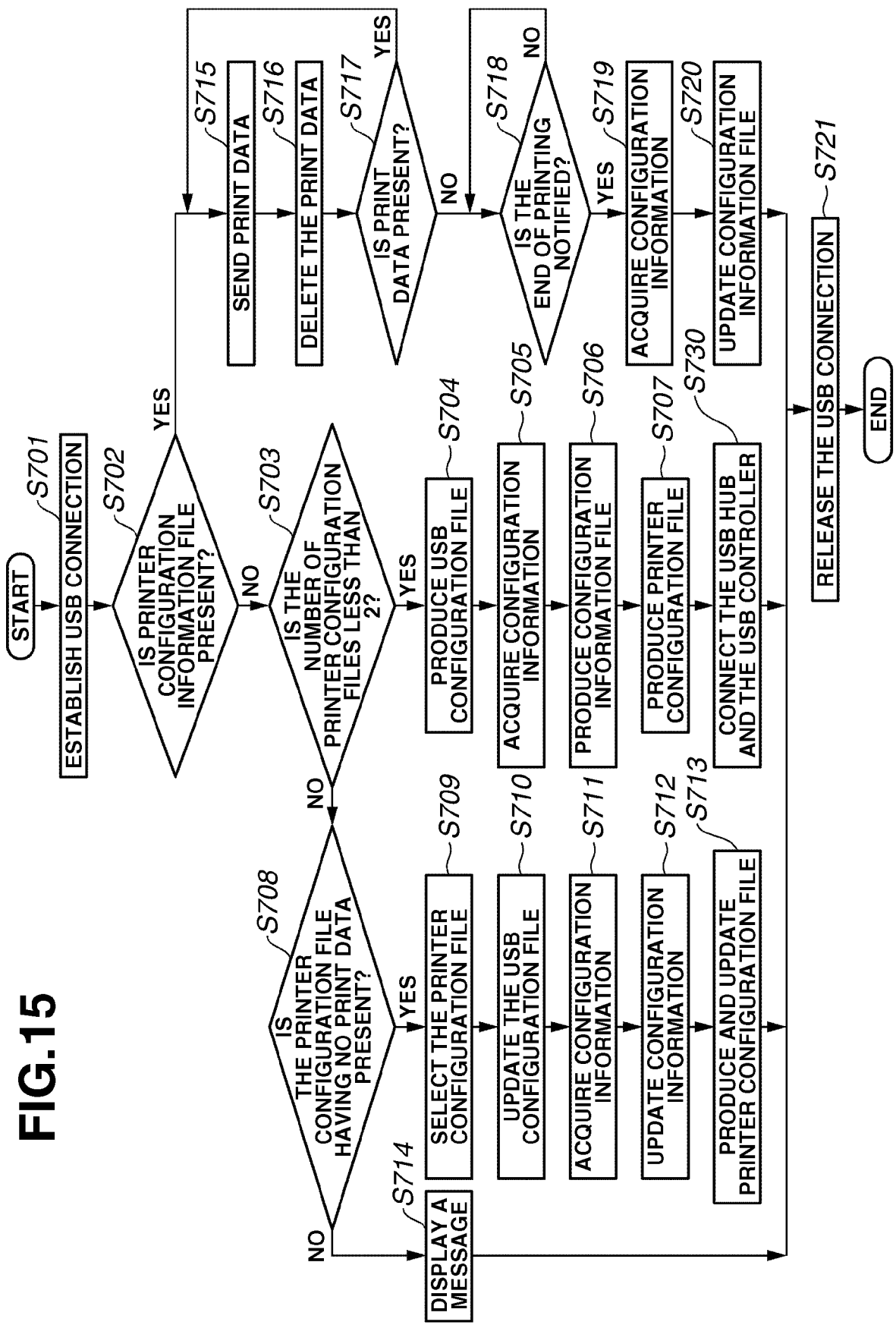
FIG. 15 is a flow chart that illustrates an example of an operation of the electronic device when the B plug of the electronic device is connected to the B receptacle of the printing machine according to the second exemplary embodiment of the present invention.

An example of an operation of the electronic device 1301 when the B plug 306 of the electronic device 1301 is connected to the B receptacle 210 of the printing machine 201, the printing machine 1302, or the printing machine 1303 is described below with reference to the flow chart of FIG. 15.

When the B plug 306 of the electronic device 1301 is connected to the B receptacle 210 of the printing machine 201, 1302, or 1303, the USB host controller 305 determines the connection. Then, the USB host controller 305 performs bus enumeration processing compliant with the USB standard to establish a USB connection (step S701). When the USB connection is established, the USB host controller 305 notifies the CPU 302 that the USB connection is established. Upon receipt of the notification, the CPU 302 retrieves a printer configuration file that has the prefix of ".prc" below the "/_printer" directory from the flash memory 304. Then, a determination is made whether a printer configuration file that coincides with the printer configuration file for either of the connected printing machine 201, 1302, or 1303 exists (step S702).

If no printer configuration file for the connected printing machine 201, 1302, or 1303 exists, a determination is made regarding the number of printer configuration files in the "/_printer" directory (step S703). If the number of printer configuration files is less than two (Yes in step S703), the processing advances to step S704. In step S704, the CPU 302 newly produces the USB configuration file "/_printer/conf" or "/_printer/conf2" for the descriptor including the device-dependent values among each of the USB-compliant descriptors received by the USB host controller 305.

Next, in order to acquire the configuration information of the printing machine 201, 1302, or 1303, the CPU 302 sends a request for acquiring the configuration information to the connected printing machine 201, 1302, or 1303 via the USB host controller 305 (step S705). When the configuration information is acquired from the connected printing machine 201, 1302, or 1303, the CPU 302 newly produces a configuration information file "/_printer/print.conf" or "/_printer/print2.conf" that includes the acquired configuration information of the printing machine 201, 1302, 1303 (step S706). Then, the CPU 302 produces a printer configuration file "/_printer/print.prc" or "/_printer/print2.prc" for the connected printing machine 201, 1302, or 1303 (step S707).

In the contents of the newly produced printer configuration file, the values received from the printing machine connected to the USB host controller 305 are set for each of the items "ProductName", "VenderName", and "PrinterName", respectively. In addition, if the connected printing machine is connected to a network, an IP address that the network port indicates is set for the item "IPAddress". On the other hand, if the connected printing machine is not connected to a network, no content is set for the item "IPAddress". In addition, the file name of the configuration information file produced in step S706 is set for the item "ConfigurationFile", and no content is set for the item "Datafile". The file name of the USB configuration file produced in step S704 is set for the item "USBconfFile".

When the configuration information file as described above is set, the processing advances to step S730. If the file "/_printer/print.prc" is set as the printer configuration file in step S707, the USB hub 309 and the USB device controller 308 are mutually connected. On the other hand, when the file "/_printer/print2.prc" is set as the printer configuration file in step S707, the USB hub 309 and the USB device controller 1310 are mutually connected. Then, the USB connection to the connected printing machine is released (step S721), and the processing ends.

If it is determined in step S703 that the number of printer configuration files below the "/_printer" directory is two or more, the electronic device 1301 refers to the content of each printer configuration file so as to determine whether print data is written in the item "Datafile" (step S708). If it is determined that the printer configuration file that includes no print data exists, the processing advances to step S709. On the other hand, if it is determined that print data is written in all of the printer configuration files, the processing advances to step S714.

In step S714, the CPU 302 displays a message "new printer cannot be registered" on the LCD operation unit 1320. Thus, the user is notified that a printing operation performed by the printing machine connected to the electronic device 1301 via the host computer 101 cannot be performed utilizing the electronic device 1301. Then, the USB connection to the connected printing machine is released (step S721), and the processing ends.

In step S709, the CPU 302 makes a selection as to which printer configuration file among the printer configuration files that includes no print data is to be updated. The selection method includes, but is not limited to, a method such that the printer configuration file whose time of updating is earliest among the printer configuration files is selected or a method such that a previously determined printer configuration file is always updated.

Next, the CPU 302 rewrites the content of a file that is set for the item "USBconfFile" in the selected printer configuration file with the device-dependent value included in each of the USB-compliant descriptors received by the USB host controller 305 (step S710). Then, in order to acquire the configuration information of the printing machine 201, 1302, or 1303, the CPU 302 sends a request for acquiring the configuration information to the printing machine 201, 1302, or 1303 via the USB host controller 305 (step S711). When the configuration information is acquired from the printing machine 201, 1302, or 1303, the CPU 302 rewrites the content of the file that is set for the item "ConfigurationFile" in the printer configuration file selected in step S709 with the acquired configuration information of the printing machine 201, 1302, or 1303 (step S712).

Then, the CPU 302 rewrites the items "ProductName", "VenderName", and the "PrinterName" in the selected printer configuration file with the values acquired from the printing machine connected to the USB host controller 305 (step S713). In addition, if the connected printing machine is connected to a network, the CPU 302 rewrites the item "IPAddress" with the IP address of the network port (step S713). When updating of the printer configuration file is completed, the USB connection with the connected printing machine is released (step S721), and the processing ends.

If it is determined in step S702 that the printer configuration file for the connected printing machine exists, the CPU 302 confirms the content that is set for the item "Datafile" in the printer configuration file. Then, the CPU 302 repeats the processing in steps S715 through S717 until no set print data remains. More specifically, the CPU 302 reads one file that stores print data designated by a "Data" tag in the item "Datafile" and sends the read file to the connected printing machine (step S715). When all the print data included in the printer configuration file is completely sent to the connected printing machine, the CPU 302 deletes the printer configuration file that includes the sent print data and deletes an entry of the file in the item "Datafile" (step S716).

When all the print data designated by the "Data" tag in the item "Datafile" is completely sent (No in step S717), the electronic device 1301 waits until the connected printing machine notifies the end of printing (step S718). When the connected printing machine notifies the end of printing of all the print data sent to the connected printing machine, the electronic device 1301 sends a request for acquiring the configuration information to the connected printing machine via the USB host controller 305 in order to acquire the configuration information of the connected printing machine (step S719). When the configuration information is acquired from the connected printing machine, the CPU 302 updates the configuration file set for the item "ConfigurationFile" of the printer configuration file for the connected printing machine with the acquired configuration information (step S720). Then, the USB connection is released (step S721), and the processing ends.

Next, an example of an operation of the host computer 101 when the electronic device 1301 is connected to the host computer 101 is described below with reference to the flow charts of FIGS. 16A through 16D and FIG. 17.

FIGS. 16A through 16D are diagrams each illustrating an example of a state of USB connection configured when the A plug 310 of the electronic device 1301 is connected to the A receptacle 107 of the host computer 101. FIG. 17 is a flow chart that illustrates an example of an operation of the host computer 101 when the electronic device 301 is connected to the host computer 101.

Referring to FIGS. 16A through 16D, the USB host 401 is configured on the USB host controller 106 shown in FIG. 2A. The USB hub 402 is configured on the USB hub 309 shown in FIG. 14. The mass storage function 403 is configured on the USB device controller 307 shown in FIG. 14. The printer function 404 is configured on the USB device controller 308 shown in FIG. 14. A printer function 1401 is configured on the USB device controller 1310 shown in FIG. 14.

Figure 16A:
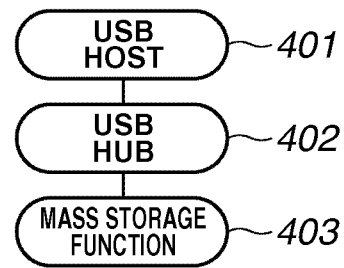
FIGS. 16A through 16D are diagrams that illustrate an example of a state of USB connection configured when the A plug provided on the electronic device is connected to the A receptacle of the host computer according to the second exemplary embodiment of the present invention.
Figure 16B:
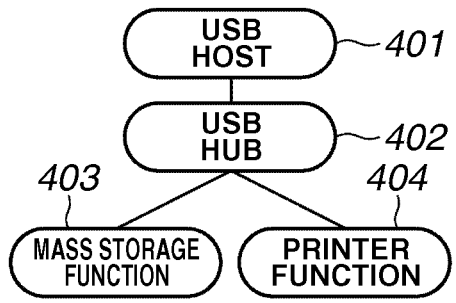
Figure 16C:
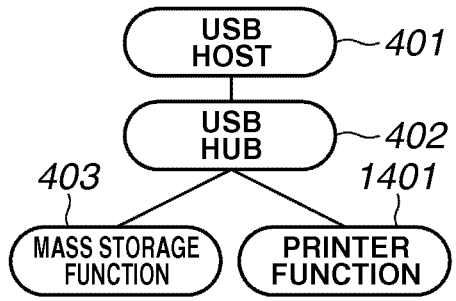
Figure 16D:
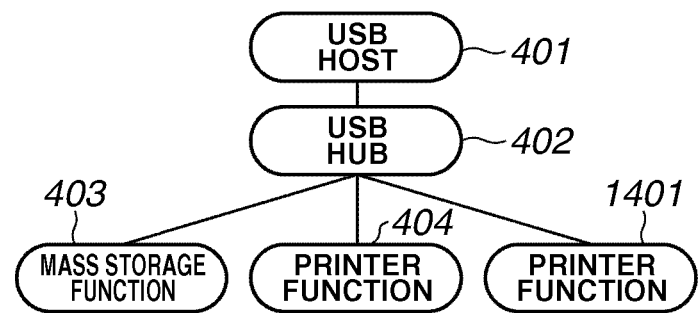
Figure 17:
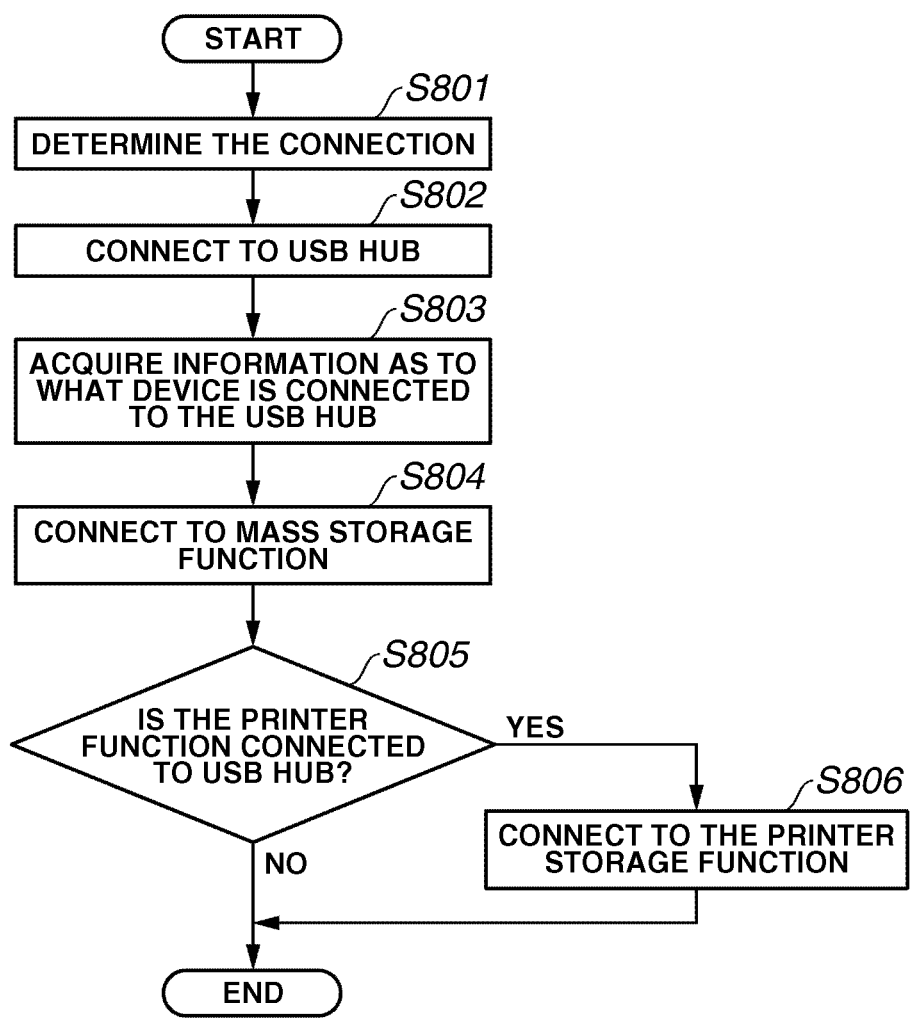
FIG. 17 is a flow chart that illustrates an example of the operation of the host computer 101 when the electronic device is connected to the host computer according to the second exemplary embodiment of the present invention.

FIG. 16A is a diagram that illustrates an example of the state of USB connection that is configured when neither of the files "/_printer/print.prc" and "/_printer/print2.prc" exists on the flash memory 304. FIG. 16B is a diagram that illustrates an example of the state of USB connection that is configured when the file "/_printer/print.prc" exists on the flash memory 304 and the file "/_printer/print2.prc" does not exist on the flash memory 304. FIG. 16C is a diagram that illustrates an example of the state of USB connection that is configured when the file "/_printer/print.prc" does not exist on the flash memory 304 and the file "/_printer/print2.prc" exists on the flash memory 304. FIG. 16D is a diagram that illustrates an example of the state of USB connection that is configured when the files "/_printer/print.prc" and "/_printer/print2.prc" exist on the flash memory 304.

Referring to FIG. 17, when the A plug 310 of the electronic device 1301 is connected to the A receptacle 107 of the host computer 101, the USB host controller 106 determines the connection (step S801). Then, the USB host controller 106 performs bus enumeration processing that is compliant with the USB standard to establish a connection with the USB hub 309 (step S802). In this state, the mutual connection between the USB host 401 and the USB hub 402 is established.

Then, the USB host controller 106 makes an inquiry to the USB hub 309 as to a device that is connected to a downstream port of the USB hub 309 (step S803). Here, the USB hub 309 and the USB device controller 307 are continuously connected to each other. Accordingly, the USB hub 309 notifies the USB host controller 106 that the USB device controller 307 is connected to the downstream port of the USB hub 309.

The USB host controller 106, when recognizing that the USB device controller 307 is connected to the USB hub 309, performs bus enumeration processing so as to establish a connection to the USB device controller 307 (step S804). At this time, the USB host controller 106 recognizes that the function of the USB device controller 307 is a mass storage function. In this way, the USB host 401 and the mass storage function 403 are mutually connected via the USB hub 402 (see FIG. 16A and FIG. 16B).

A state of connection between the USB device controllers 308 and 1310 and the USB hub 309 differs depending on the state of the electronic device 1301. When the electronic device 1301 is in an initial state, the USB device controllers 308 and 1310 are not connected to the USB hub 309. When the B plug 306 of the electronic device 1301 is connected to the B receptacle of each printing machine as described above, the CPU 302 produces the file "/_printer/print.prc" or the file "/_printer/print2.prc" on the flash memory 304. Then, the CPU 302 allows the USB hub 309 and the USB device controllers 308 and 1310 to be mutually connected.

When the USB device controllers 308 and 1310 and the USB hub 309 are mutually connected in this manner, the USB hub 309 notifies the USB host controller 106 that the USB device controllers 308 and 1310 are connected to the USB hub 309. Upon recognition of the connection of either one of or both of the USB device controllers 308 and 1310 with the USB hub 309 (step S805), the USB host controller 106 performs bus enumeration processing on the connected USB controller 308 or 1310. Then, the USB host controller 106 establishes a connection with the USB device controller 308 or 1310 (step S806).

In this processing, the USB device controller 308 sets a value for a file that is set in the item "USBconfFile" of the file "/_printer/print.prc" as a device-dependent value of each descriptor for the USB-compliant printer class. Then, the USB device controller 308 notifies the set value to the USB host controller 106.

In addition, the USB device controller 1310 sets a value for a file that is set in the item "USBconfFile" of the file "/_printer/print2.prc" as a device-dependent value of each descriptor for the USB-compliant printer class. Then, the USB device controller 1310 notifies the set value to the USB host controller 106.

In the file that is set in the item "USBconfFile" of the file "/_printer/print.prc" or the file "/_printer/print2.prc", a value that the USB device controller 1310 acquires from the USB device controller of each printing machine is stored. Accordingly, the USB host controller 106 recognizes that the USB device controller 308 is the same as the USB device controller of the printing machine that is connected when the printer configuration file "/_printer/print.prc" is produced. In addition, the USB host controller 106 recognizes that the USB device controller 1310 is the same as the USB device controller of the printing machine that is connected when the printer configuration file "/_printer/print2.prc" is produced.

When the bus enumeration processing by the USB host controller 106 and each USB device controller is completed, the USB host controller 106 recognizes that the function of each USB device controller is a printer function. In this manner, the USB host 401 and at least one of the printer function 404 and the printer function 1401 are mutually connected via the USB hub 402 (see FIGS. 16B through 16D).

Figure 18:
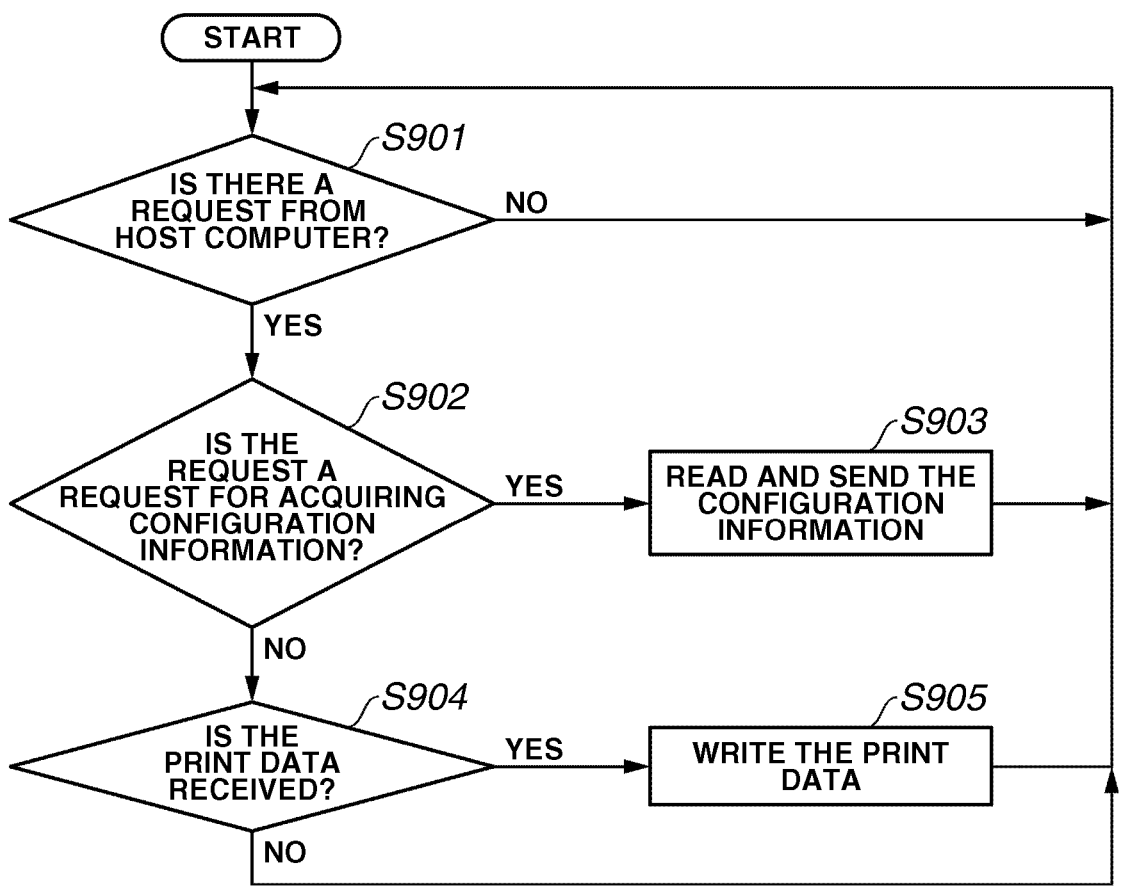
FIG. 18 is a flow chart that illustrates an example of the operation of the electronic device in performing printing by designating a specific printing machine in the state where the A plug of the electronic device is connected to the A receptacle of the host computer according to the second exemplary embodiment of the present invention.

Next, an example of an operation of the electronic device 1301 in performing printing while designating a specific printing machine in the state where the A plug 310 of the electronic device 1301 is connected to the A receptacle 107 of the host computer 101 is described below with reference to the flow chart of FIG. 18.

As described above, the state of USB connection configured when the electronic device 1301 is connected to the host computer 101 can be any of the four types of states shown in FIGS. 16A through 16D. Among these states, in the case of the state shown in FIG. 16A, the electronic device 1301 operates as a known USB-compliant mass storage device. That is, the electronic device 1301 only reads and writes data from and to the flash memory 304 upon a request from the host computer 101. Accordingly, a detailed description of the state shown in FIG. 16A is omitted herein. An operation of the electronic device 1301 in the states shown in FIGS. 16B through 16D is described below.

When the electronic device 1301 is connected to the host computer 101 and the state of USB connection is any of the states shown in FIGS. 16B through 16D, the CPU 302 waits for an interruption by the USB device controller 308 or 1310 (step S901). The USB device controller 308 or 1310, upon receipt of the request from the host computer 101 via the USB, generates an interruption signal to the CPU 302 to request the CPU 302 to process the received request. Then, the CPU 302 makes a determination as to the request from the host computer 101 (step S902).

If the request is determined to be a request for acquiring the function configuration information (Yes in step S902), the processing advances to step S903. On the other hand, if print data is received (Yes in step S904), the processing advances to step S905. If the request is a request other than the requests described above, no processing is performed, and the processing returns to step S901 to wait for an interruption by the USB device controller 308 or 1310.

When the processing advances to step S903, the CPU 302 reads the configuration information from the item "ConfigurationFile" of the file "/_printer/print.prc" or the content "/_printer/print2.prc" depending on the content of the request. Then, the CPU 302 provides the read configuration information to the host computer 101 via the bulk-in endpoint of the USB device controller 308 or 1310 that received the request. Note that when the USB device controller 308 received the request, the item "ConfigurationFile" of the file "/_printer/print.prc" is used. On the other hand, when the USB device controller 1310 received the request, the item "ConfigurationFile" of the file "/_printer/print2.prc" is used.

When the processing advances to step S905, the CPU 302 produces, from the received print data, a new file having the prefix of ".prn" in the "/_printer" directory. Then, the CPU 302 writes the name of the produced file in the item "Datafile" of the printer configuration file "/_printer/print.prc" or "/_printer/print2.prc" while adding the content "Data" thereto. Note that when the USB device controller 308 received the request, the CPU 302 writes the name of the produced file in the item "Datafile" of the printer configuration file "/_printer/print.prc". On the other hand, when the USB device controller 1310 received the request, the CPU 302 writes the name of the produced file in the item "Datafile" of the printer configuration file "/_printer/print2.prc".

An operation of the host computer 101 in performing printing by designating each printing machine and an operation of the electronic device 1301 when the electronic device 1301 is connected to each printing machine is similar to the operation described in the first exemplary embodiment, and accordingly, a description thereof is omitted herein.

As described above, in the present exemplary embodiment, when the B plug 306 of the electronic device 1301 is connected to the B receptacle of each printing machine, the electronic device 1301 operates as a USB host. More specifically, the electronic device 1301 acquires the configuration information of the connected printing machine from the connected printing machine. In this case, as viewed from the printing machine, the electronic device 1301 operates the same as the host computer 101.

When the A plug 310 of the electronic device 1301 is connected to the A receptacle 107 of the host computer 101, the electronic device 1301 operates as a printer function device. That is, the host computer 101 recognizes that the electronic device 1301 and each printing machine that is connected to the electronic device 1301 are the same. In this case, when two printing machines are connected to the electronic device 1301, the host computer 101 recognizes that each of the two printing machines is connected to the electronic device 1301. Accordingly, the state in this case is the same as the state where each printing machine connected to the electronic device 1301 is connected to the host computer 101. Accordingly, when the user performs the same operation on the host computer 101 for printing to the printing machine 201, 1302, Or 1303, print data is stored in the electronic device 1301.

In the state in which the print data is stored in the electronic device 1301 in this manner, the user disconnects the electronic device 1301 from the host computer 101 and then connects the electronic device 1301 to the B receptacle 210 of each printing machine. Then, the electronic device 1301 sends the stored print data to the connected printing machine, so that the connected printing machine automatically performs printing. To perform printing of different print data using the electronic device 301, the user re-connects the electronic device 301 to the host computer 101 and performs another printing operation before connecting the electronic device 1301 to each printing machine.

That is, as viewed from the user, with respect to an operation via the host computer 101, printing can be performed with the same operation as the operation performed when the host computer 101 and each printing machine are mutually connected via a network or a USB cable. In addition, the operation of the host computer 101 and the operation of each printing machine are the same as an ordinary operation, and accordingly, printing can be performed under an existing print environment via the electronic device 1301.

Other Exemplary Embodiments

The above described features of the present invention can also be achieved by various devices operating to implement the functions of the above-described embodiments by providing a computer (CPU or MPU) of an apparatus or system connected to the various devices with program code of software implementing the functions of the embodiments, where the various devices are operated by reading and executing the program code stored in the computer of the apparatus or system.

In this case, the program code itself implements the functions of the above-described embodiments, and accordingly, the program code itself and a medium for supplying the program code with the computer, for example, a storage medium storing the program code, constitute the present invention. As the storage medium for supplying such program code, a floppy disk, a hard disk, an optical disk, a magneto-optical disk, a CD-ROM, a magnetic tape, a nonvolatile memory card, and a ROM can be used.

In addition, the functions according to the above-described embodiments are implemented not only by executing program code read by a computer but also are implemented by the processing in which an operating system (OS) or a combination of the OS and other application software carries out a part of or the whole of the actual processing based on an instruction given by the program code.

In an exemplary embodiment of the present invention, after the supplied program code is written in a memory provided on a function expansion board inserted in a computer or a function expansion unit connected to a computer, a CPU or the like provided in the function expansion board or the function expansion unit carries out a part of or the whole of the processing to implement the functions of the embodiments described above.

In an exemplary embodiment of the present invention, an information processing apparatus produces print data to be printed by a printing apparatus by using a printer driver compatible with a printing apparatus that is identified by printing apparatus identification information stored in a removable medium and stores the produced print data in the removable medium. Accordingly, the print data can be stored in the removable medium with the same operation as the operation performed in outputting the print data from the information processing apparatus to the printing apparatus via a network or a cable.

In addition, a printing apparatus connected to a removable medium, when a printing apparatus that is identified by printing apparatus identification information retrieved from the removable medium is identical with the printing apparatus connected to the removable medium, acquires, from the removable medium, job information that indicates a content of a job for print data whose output destination is the printing apparatus. The printing apparatus then performs printing based on print data corresponding to the acquired job information. Accordingly, print data stored in the removable medium can be printed without performing a complicated operation.

In addition, an electronic device, when the electronic device stores printing apparatus identification information for identifying a printing apparatus that is mutually connected to the electronic device, sends print data whose output destination is the mutually-connected printing apparatus to the mutually-connected printing apparatus. Accordingly, print data stored in the removable medium can be printed by an output destination designated for the print data without performing a complicated operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-321377 filed Nov. 4, 2005, which is hereby incorporated by reference herein in its entirety.

What is claimed is:

1. A printing apparatus that is connectable to a removable medium, the removable medium being configured to store a file generated based on print data upon receiving the print data transmitted from a host computer and to store information for identifying the file in a printer configuration file for the printing apparatus instructed to perform printing processing, the printing apparatus comprising:
a determination unit configured to determine whether the printer configuration file of the printing apparatus exists in the removable medium in a case where the printing apparatus is connected to the removable medium via an A plug of the removable medium; and
an execution unit configured to read out print data from the removable medium and execute printing processing in a case where the determination unit determines that the printer configuration file of the printing apparatus exists in the removable medium,
wherein the removable medium determines whether the printer configuration file of the printing apparatus exists in the removable medium in a case where the printing apparatus is connected to the removable medium via a B plug of the removable medium, and sends print data to the printing apparatus in a case where the removable medium determines the printer configuration file exists in the removable medium.

2. The printing apparatus according to claim 1, further comprising:
a second determination unit configured to determine whether a printer configuration file of a different printing apparatus exists in the removable medium in a case where the determination unit determines that the print configuration file of the printing apparatus does not exist in the removable medium; and
a display unit configured to display a list of a print job of the different printing apparatus in a case where the second determination unit determines that the printer configuration file of the different printing apparatus exists in the removable medium,
wherein the execution unit executes a print job selected from the list displayed by the display unit.

3. The printing apparatus according to claim 2, wherein the display unit displays information indicating a possible ignorance of a function setting with the list of the print job of the different printing apparatus.

4. A removable medium configured to store a file generated based on print data upon receiving the print data transmitted from a host computer and to store information for identifying the file in a printer configuration file for a printing apparatus instructed to perform printing processing, the removable medium comprising:
- a determination unit configured to determine whether the printer configuration file of a printing apparatus exists in the removable medium in a case where the removable medium is connected via a B plug to the printing apparatus; and
- a sending unit configures to send print data to the printing apparatus in a case where the determination unit determines that the printer configuration file of the printing apparatus exists in the removable medium,
- wherein the printing apparatus determines whether the printer configuration file of the printing apparatus exists in the removable medium in a case where the removable medium is connected via an A plug to the printing apparatus, reads out print data from the removable medium in a case where the printing apparatus determines that the printer configuration file of the printing apparatus exists in the removable medium, and executes printing processing of the print data.

5. A printing method which is executed in a printing apparatus connectable to a removable medium, the removable medium being configured to store a file generated based on print data upon receiving the print data transmitted from a host computer and to store information identifying the file in a printer configuration file for a printing apparatus instructed to perform printing processing, the printing method comprising:
- determining whether the printer configuration file of the printing apparatus exists in the removable medium in a case where the printing apparatus is connected to the removable medium via an A plug;
- reading out print data from the removable medium in a case where the printer configuration file of the printing apparatus is determined to exist in the removable medium and executing printing processing,
- wherein the removable medium determines whether the printer configuration file of the printing apparatus exists in the removable medium in a case where the printing apparatus is connected to the removable medium via a B plug of the removable medium, and sends print data to the printing apparatus in a case where the removable medium determines the printer configuration file exists in the removable medium.

6. The printing method according to claim 5, further comprising:
- determining whether a printer configuration file of a different printing apparatus exists in the removable medium in a case where the printer configuration file of the printing apparatus is determined not to exist in the removable medium; and
- displaying a list of a print job of the different printing apparatus in a case where the printer configuration file of the different printing apparatus is determined to exist in the removable medium,
- wherein a selected print job from the list displayed in the displaying step is executed in the executing step.

7. The printing method according to claim 6, wherein the list of the print job of the different printing apparatus is displayed with information indicating a possible ignorance of a function setting with the list of the print job of the different printing apparatus.

* * * * *